United States Patent [19]

Tanaka et al.

[11] Patent Number: 5,315,634
[45] Date of Patent: May 24, 1994

[54] AUTOMATIC TRADING METHOD AND APPARATUS

[75] Inventors: Kazuaki Tanaka, Sagamihara; Takeshi Matsuki, Musashino; Kazuo Takaragi, Ebina, all of Japan

[73] Assignee: Hitachi, Ltd., Tokyo, Japan

[21] Appl. No.: 576,690

[22] Filed: Aug. 31, 1990

[30] Foreign Application Priority Data

Sep. 4, 1989 [JP] Japan .................................. 1-227366
Jul. 23, 1990 [JP] Japan .................................. 2-193012

[51] Int. Cl.$^5$ .......................................... H04M 11/08
[52] U.S. Cl. ......................................... 379/57; 379/75; 364/222.2; 364/222.3; 364/227.2; 364/918.8
[58] Field of Search ....................... 379/57, 58, 95, 96, 379/100; 364/222.2, 222.3, 225, 227.2, 918.8, 919, 919.2, 919.4, 401, 408; 395/200, 700; 340/825.26, 825.27, 825.31, 825.32, 825.34

[56] References Cited

U.S. PATENT DOCUMENTS

| | | | |
|---|---|---|---|
| 3,976,840 | 8/1976 | Cleveland et al. ...................... | 379/95 |
| 4,598,367 | 7/1986 | DeFrancesco et al. | |
| 4,799,156 | 1/1989 | Shavit et al. | |
| 4,881,129 | 11/1989 | Mitsuhashi ........................... | 379/100 |
| 4,974,254 | 11/1990 | Perine et al. ........................... | 379/96 |
| 5,038,284 | 8/1991 | Kramer .......................... | 340/825.27 |

FOREIGN PATENT DOCUMENTS

| | | | |
|---|---|---|---|
| 0116074 | 6/1985 | Japan . | |
| 0126758 | 6/1987 | Japan ..................................... | 379/95 |
| 0025634 | 1/1989 | Japan ..................................... | 379/95 |
| 2204971 | 11/1988 | United Kingdom . | |

OTHER PUBLICATIONS

Telecommunications magazine advertisement "Smarter Than Smart ITT Security Modem", p. 106, Apr. 1986.
Telecommunications magazine article "Securing Dial-Up Networks", by J. Holmes, Mar. 1984, pp. 84, 124.
Telecommunications magazine advertisement "Innovative Products from a Data Communications Leader", p. 37, Apr. 1986, vol. 20, No. 4.
Bloom, Paul et al. "A Network Solution for Improved Security for Computer Access," Oct. 1988, pp. 379-382. Proceedings of the 9th International Conference on Computer Communication (Oct. 30–Nov. 3, 1988). (English).

Primary Examiner—Curtis Kuntz
Assistant Examiner—Dwayne D. Bost
Attorney, Agent, or Firm—Fay, Sharpe, Beall, Fagan, Minnich & McKee

[57] ABSTRACT

A method and system is provided for automatically trading of items such as stocks with improved security. After receiving an initial identifying contact from a contractor, a trader will contact the contractor with a different communication device from the initial contact with confirmation information that was stored in association with a contractor first identifying code. The contractor must then reconfirm the fairness of the trading data using at least a portion of the confirmation information.

41 Claims, 44 Drawing Sheets

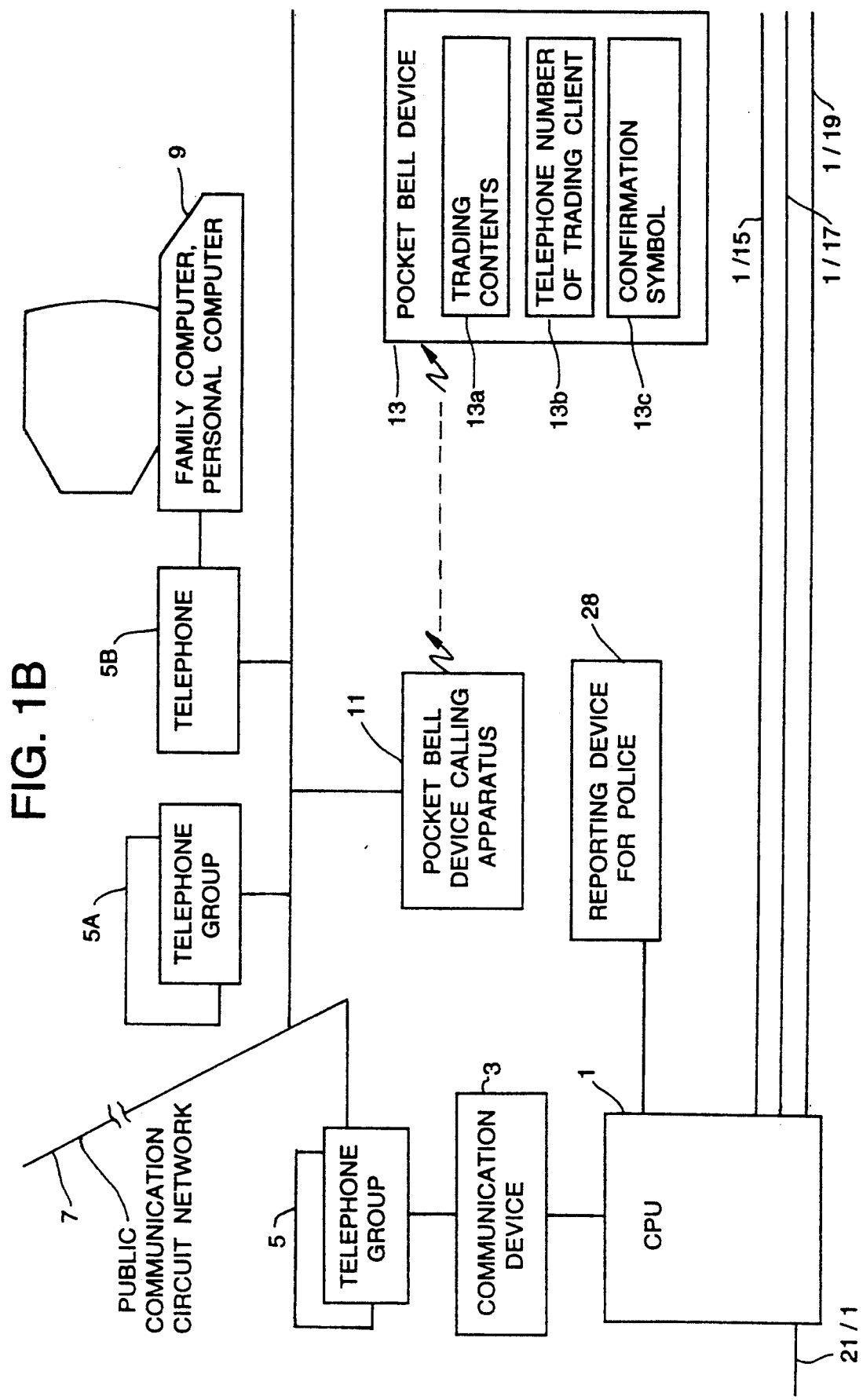

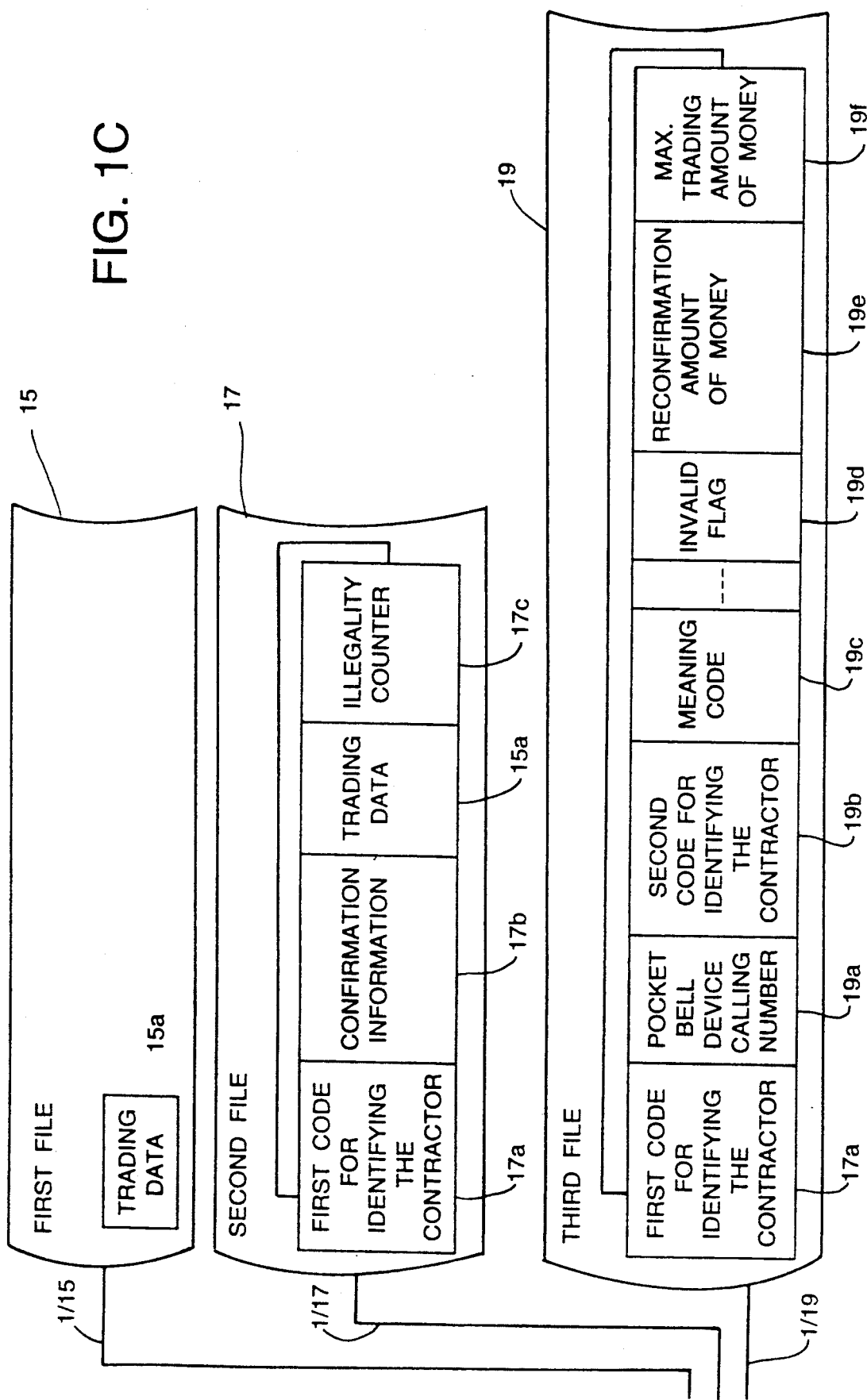

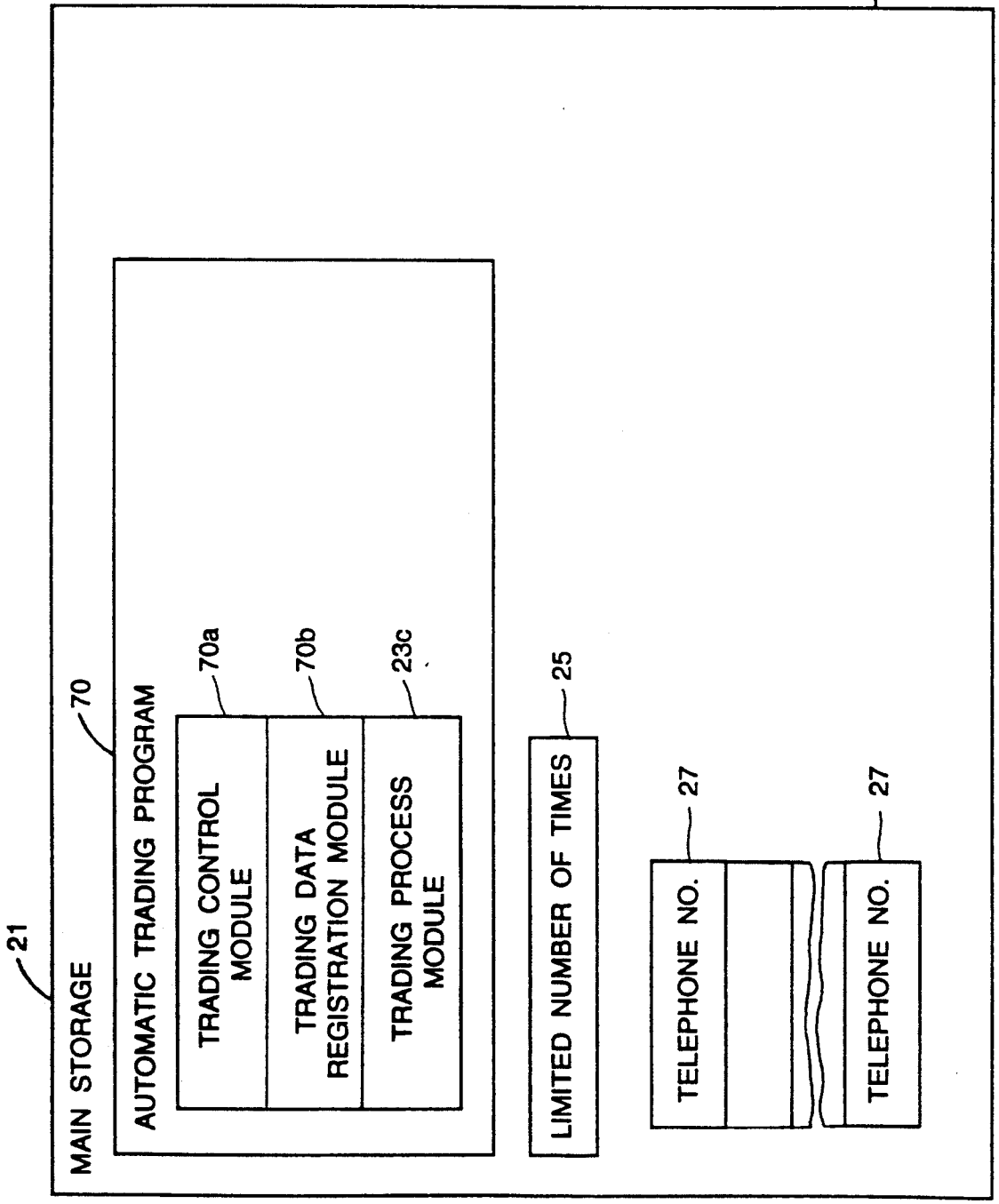

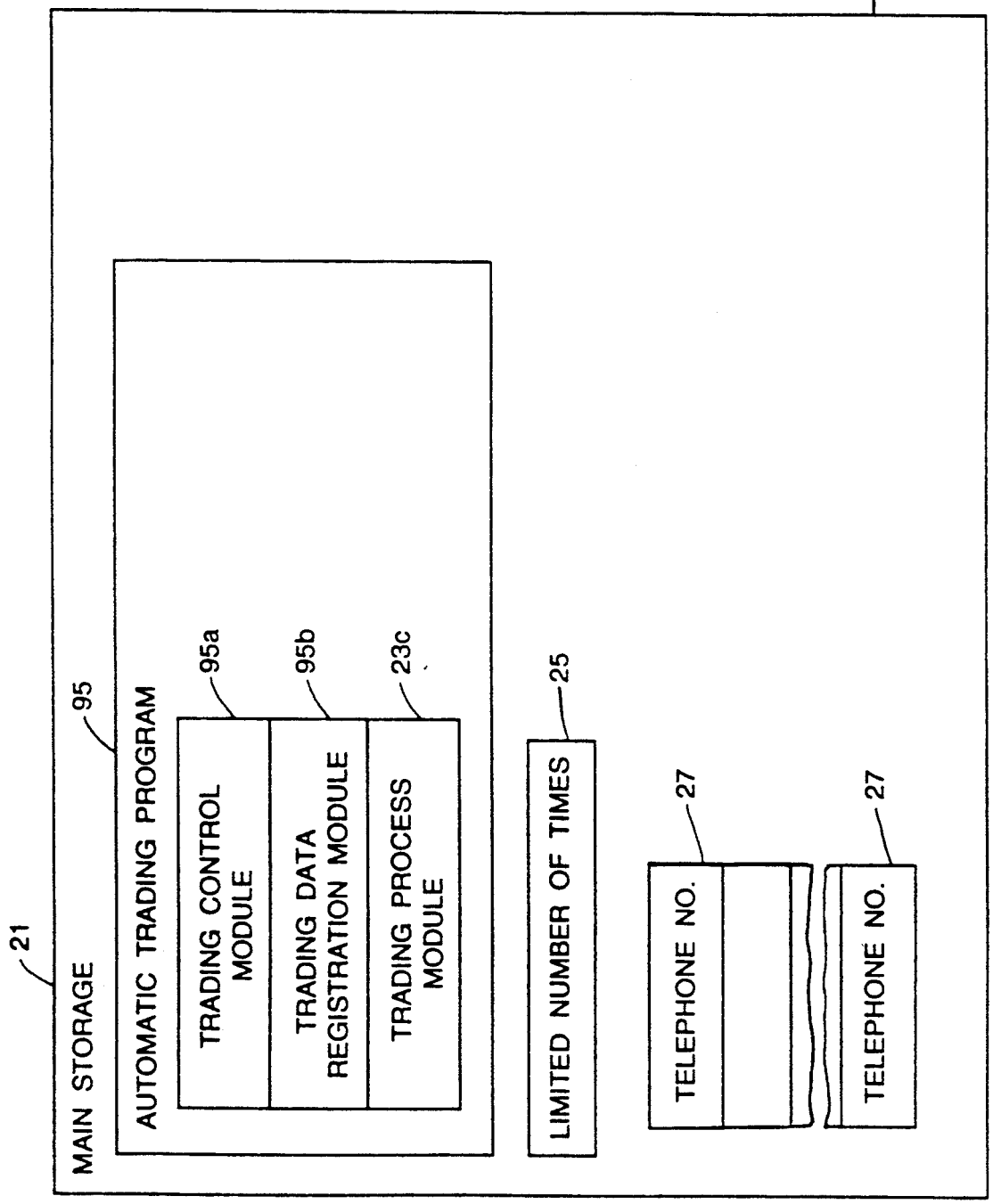

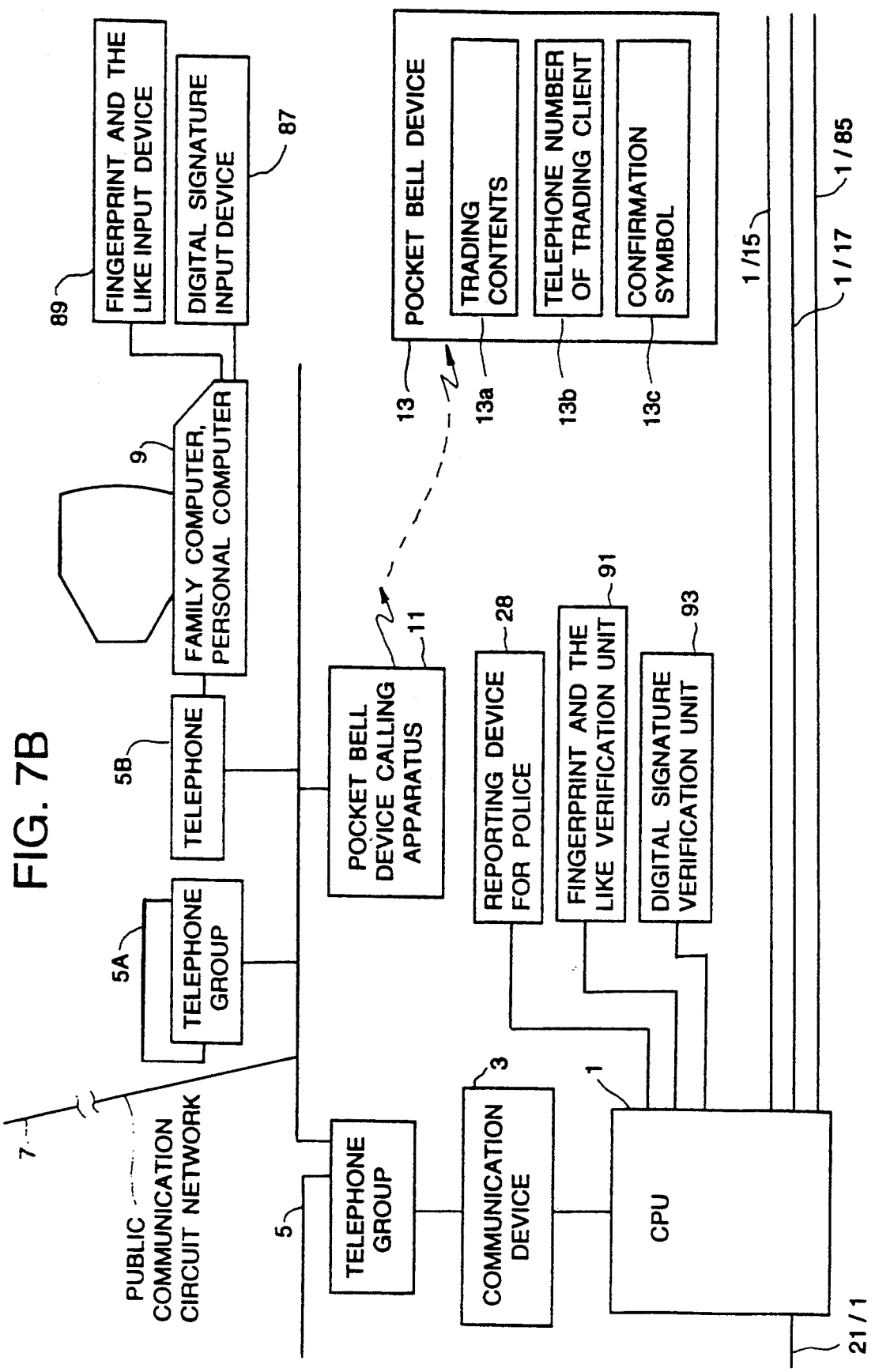

FIG. 8

| RECONFIRMATION METHOD INFORMATION | | | | | | | |
|---|---|---|---|---|---|---|---|
| RANGE OF TRADING AMOUNT OF MONEY | POCKET BELL DEVICE CALLING NUMBER | SECOND CODE FOR IDENTIFYING THE CONTRACTOR | MEANING CODE | --- | RANGE OF TRADING AMOUNT OF MONEY | DIGITAL SIGNATURE CODE | RANGE OF TRADING AMOUNT OF MONEY | DATA OF FINGERPRINT AND THE LIKE | |
| 85a-1 | 19a | 19b | 19c | | 85a-2 | 85a-3 | 85a-4 | 85a-5 | |

85a

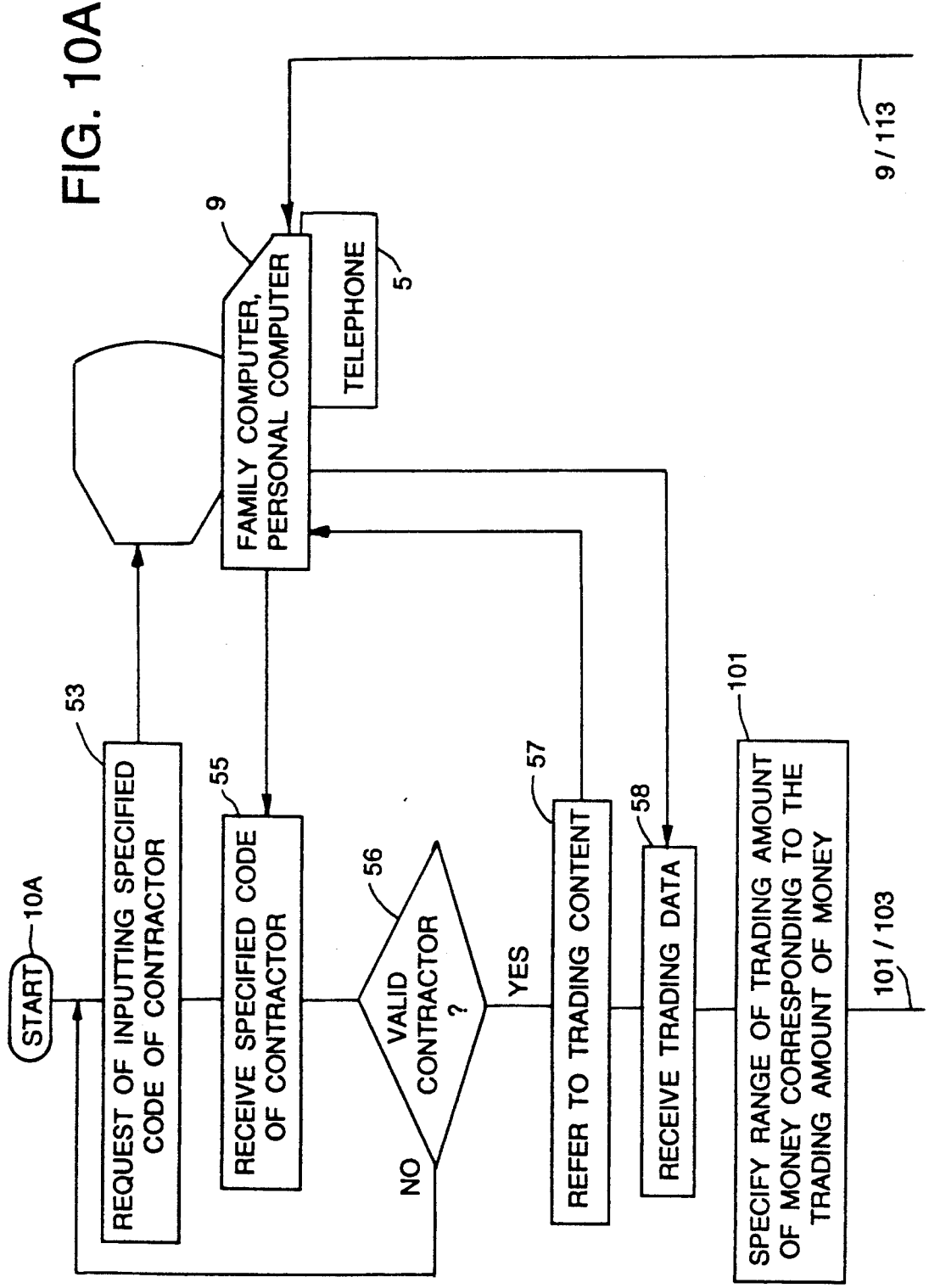

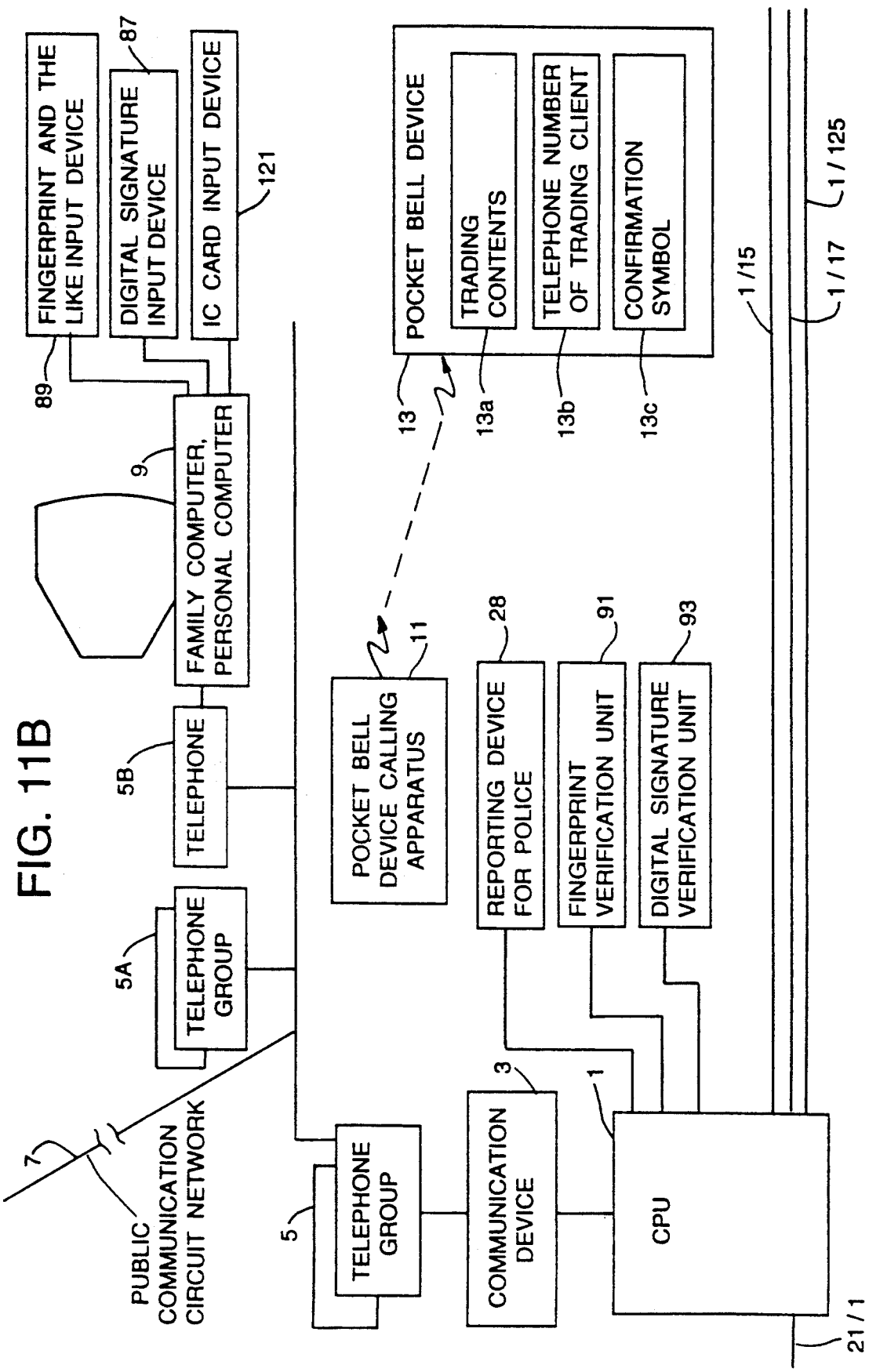

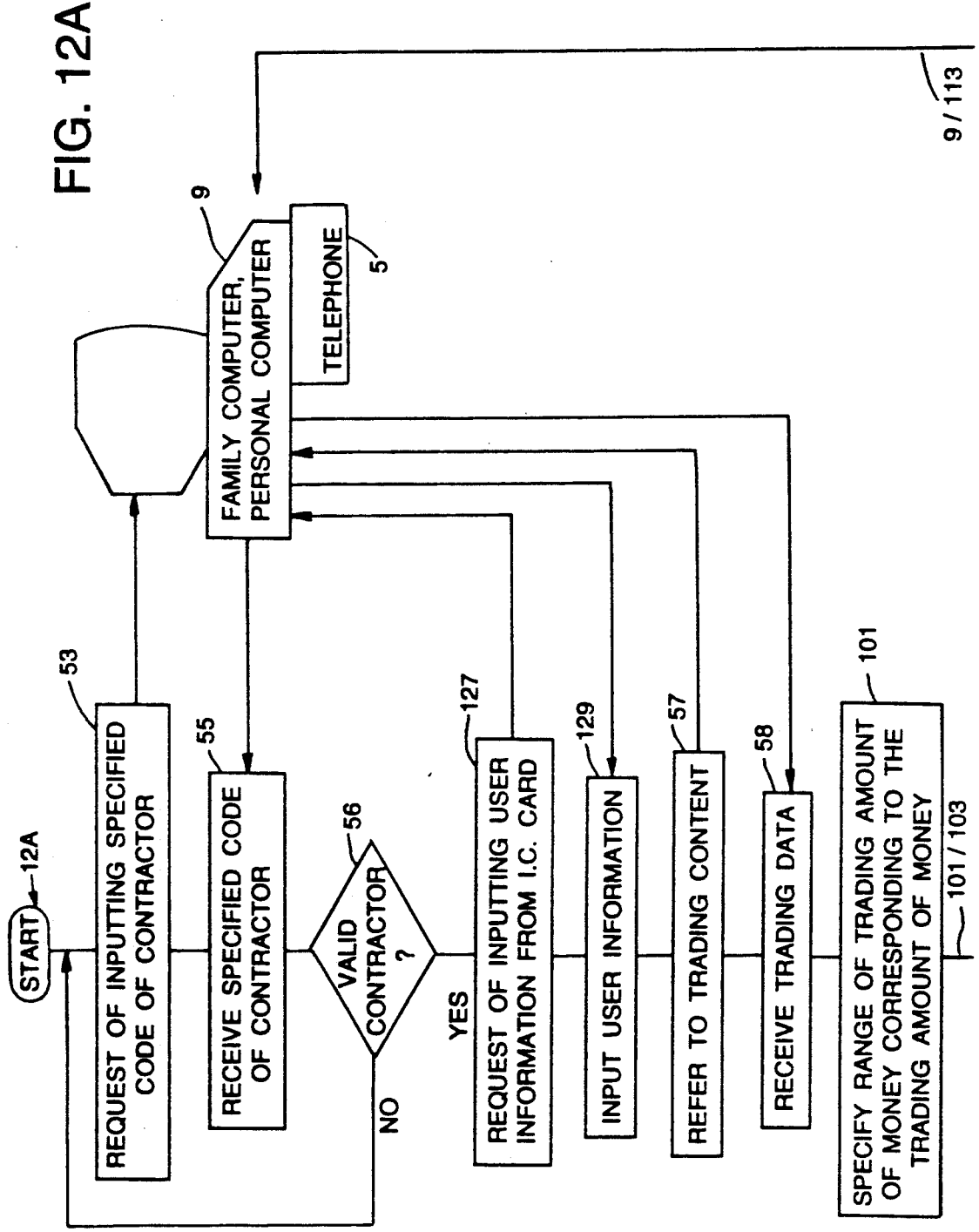

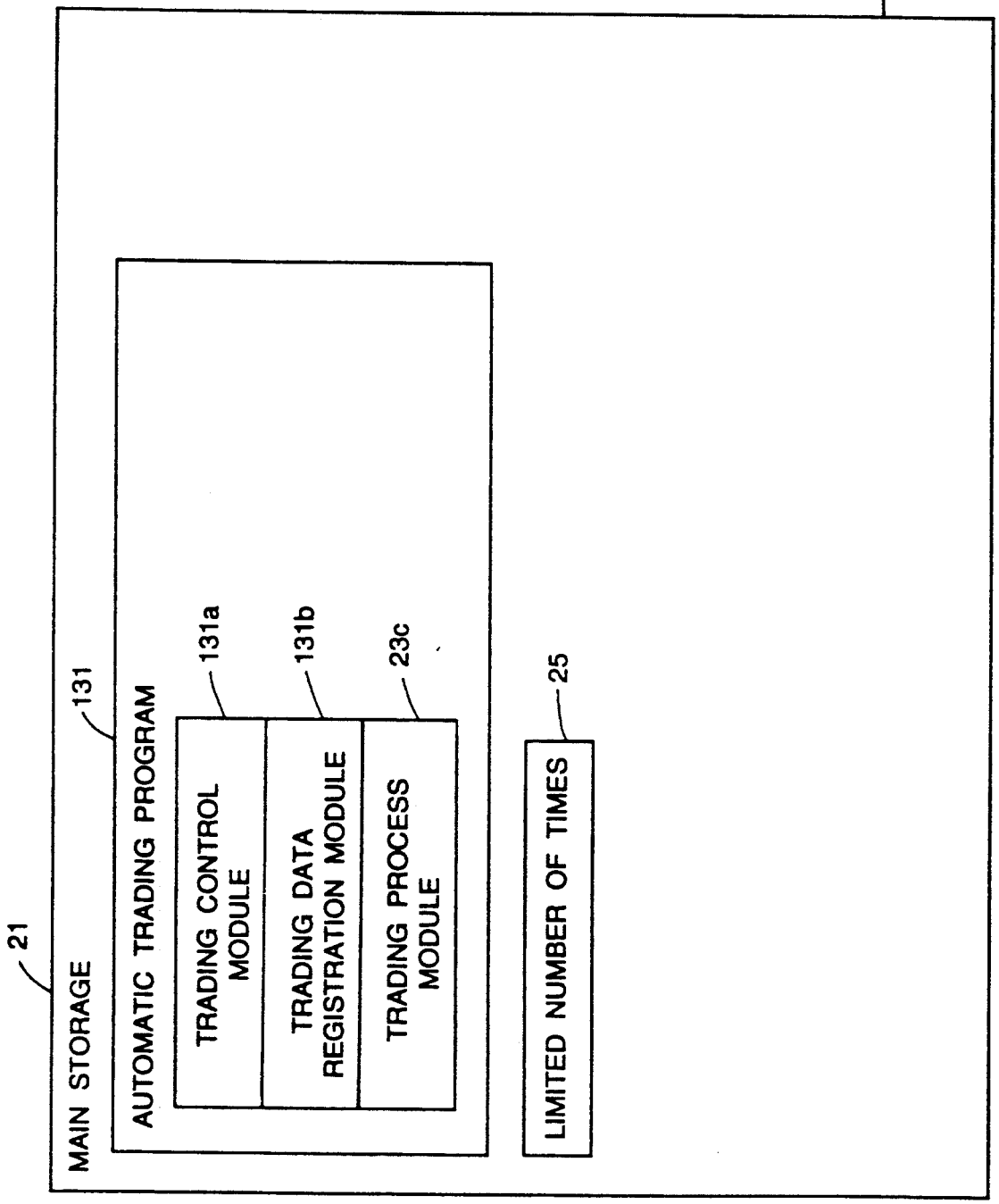

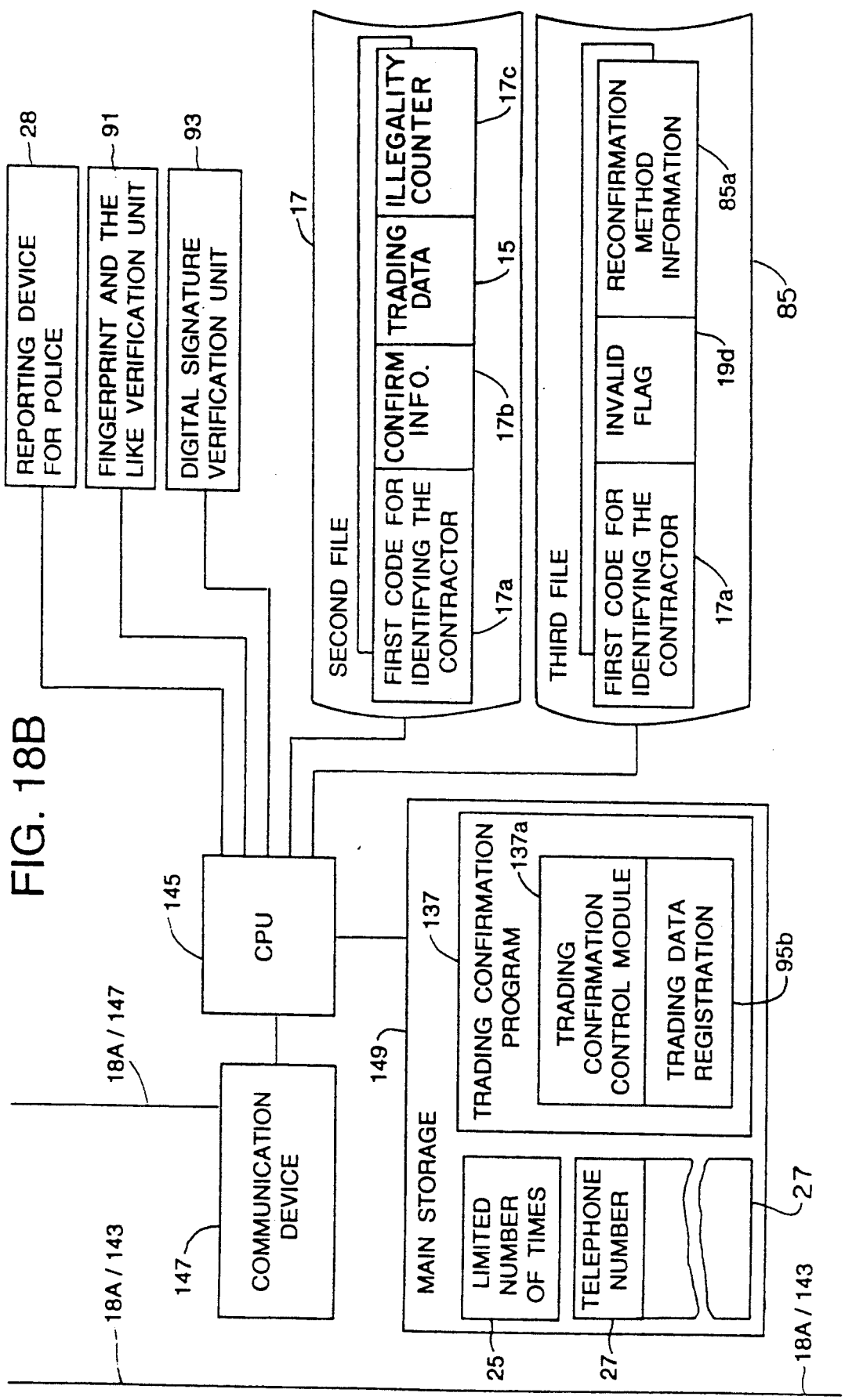

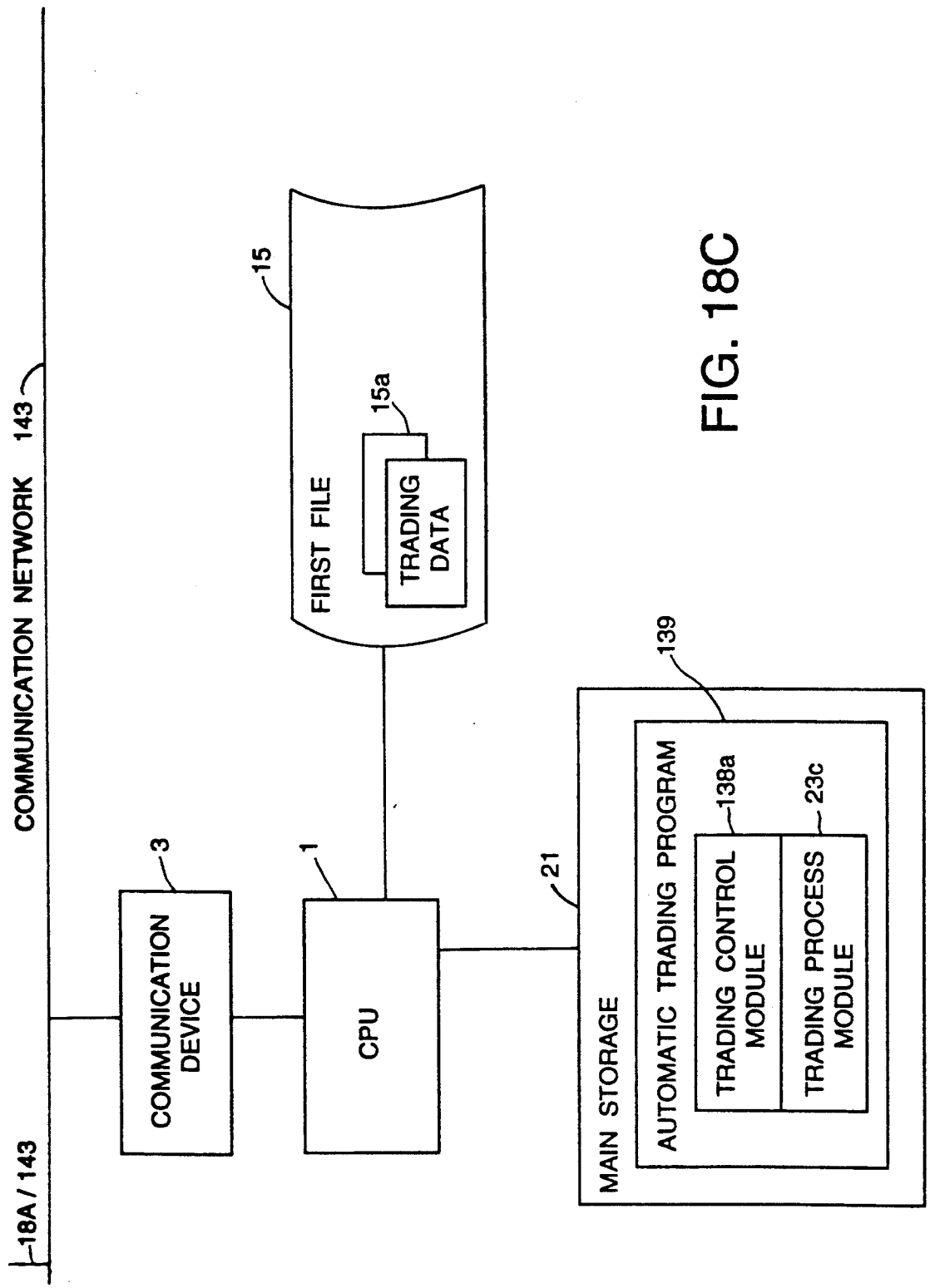

AUTOMATIC TRADING METHOD AND APPARATUS

BACKGROUND OF THE INVENTION

1. Field of the Invention

This invention relates to electronic trading systems and more particularly to an automatic trading method and apparatus wherein a confirmation procedure is provided to verify that a subject trade is properly authorized. After a request for automatic trading of stock and the like, the confirmation occurs by way of a pocket bell device, a handheld telephone or a family computer via a public communication circuit network.

2. Description of the Prior Art

The trading of items such as stocks, medium term national bond funds and the like has been practiced by a variety of different means with terminals such as a telephone, a family computer or a personal computer via a public communication circuit network. For example, a home trading system has been practiced for recording the trading data into the file for registering the trade without the need or aid of special security measures from a security company. More particularly, at the time of making a contract with a contractor to accept automatic trading from him, a specified code to clearly identify the contractor and a password is set in order to assure that the automatic trading is true and proper, i.e., that it is a "fair" trade. The specified code and password are communicated prior to the processing of the automatic trading, and they are checked to determine if they are correct and in proper agreement. If so, the contractor is recognized to be the contractor who has the specified code, and then his order for automatic trading is accepted.

In accordance with another prior known method, a terminal device for each contractor is specifically identified and authorized to communicate the request for the automatic trading. In response to a connection for automatic trading, the confirmation of the request from the previously identified terminal device is obtained by transferring back again to the terminal device the content of the automatic trading from the signal receiving side.

PROBLEMS TO BE SOLVED BY THE INVENTION

If the contractor identifying code, such as a user code or password, is known to a third party who improperly or illegally uses it, then trading can occur against the will of the contractor. For example, mischief by his family, especially by his children, or even the threat of improper third party trading, presents substantial inhibitions against the use of automatic trading. Where automatic trading is limited to an identified terminal device, the terminal may have to be carried so that its usefulness is substantially limited particularly in the buying and selling of stocks where timely automatic trading is necessary.

A helpful trade-off between usability and reliability cannot be obtained by employing plural kinds of contractor recognizing methods having different characteristics of operation, depending on the amount of money of the automatic trading.

In automatic trading such as the booking of airline or train tickets where many unspecified users will be involved, it was automatically assumed that the booking was done by the contractor of the used telephone, without confirming that it really was the contractor of that telephone. Of course, sometimes the assumption was wrong.

The present invention provides new and improved methods and devices which overcome all of the foregoing problems to provide a new automatic trading system which is simple in operation and still provides improvements in secure fair trading.

BRIEF SUMMARY OF THE INVENTION

In accordance with the present invention a contractor is recognized by the combination of a user code and a password for identifying the contractor, and in order to improve the reliability over conventional automatic trading, the fairness of the request of the automatic trading by the contractor is confirmed by a route different from the route of the automatic trading, and also by way of the communication device such as a pocket bell device or a handheld telephone having a wireless signal receiving function capable of being carried by the contractor.

It is another feature of the invention that in deciding that the trading is a trading by the correct contractor who is first identified on the basis of a first specified code from a first communication device such as a telephone, a family computer, a personal computer and the like via a public communication circuit network, the trading data is registered into a first file when its fairness is confirmed, and then the automatic trading is performed on the basis of the trading data so registered in the first file.

It is yet another feature that the first specified code and the calling number of a second communication device different from the first communication device are stored as part of the confirmation information, so they can be later used with the second communication device, in response to the request for the automatic trading by the first specified code from the contractor. In deciding if the request of the automatic trading is the trading from the correct contractor, in response to the reconfirmation contact from the contractor based on this confirmation information, the trading data of the contractor is registered into the first file when its fairness is confirmed.

Accordingly it is an object and benefit of the present invention to provide an automatic trading method having improved reliability and security. Other benefits and advantages will become apparent to those skilled in the art upon a reading of this specification.

BRIEF DESCRIPTION OF THE DRAWINGS

FIGS. 1A-C are a whole constructional figure of a first embodiment of this invention;

FIGS. 4A-C are a whole constructional assembly of a second embodiment;

FIGS. 7A-C are a whole constructional assembly of a third embodiment of this invention;

FIG. 8 is a detailed figure for description of user information in the case of the third embodiment;

FIGS. 10A-B are a flowchart of the process of the trading data registering module in the case of the third embodiment;

FIGS. 11A-C are a whole constructional assembly of a fourth embodiment of this invention;

FIGS. 12A-B are a flowchart of the process of the trading data registering module in the case of the fourth embodiment;

FIGS. 13A-C are a whole constructional assembly of a fifth embodiment of this invention;

FIGS. 18A-C are a whole constructional figure of a seventh embodiment of this invention;

DETAILED DESCRIPTION OF THE PREFERRED EMBODIMENTS

Figure 1A:
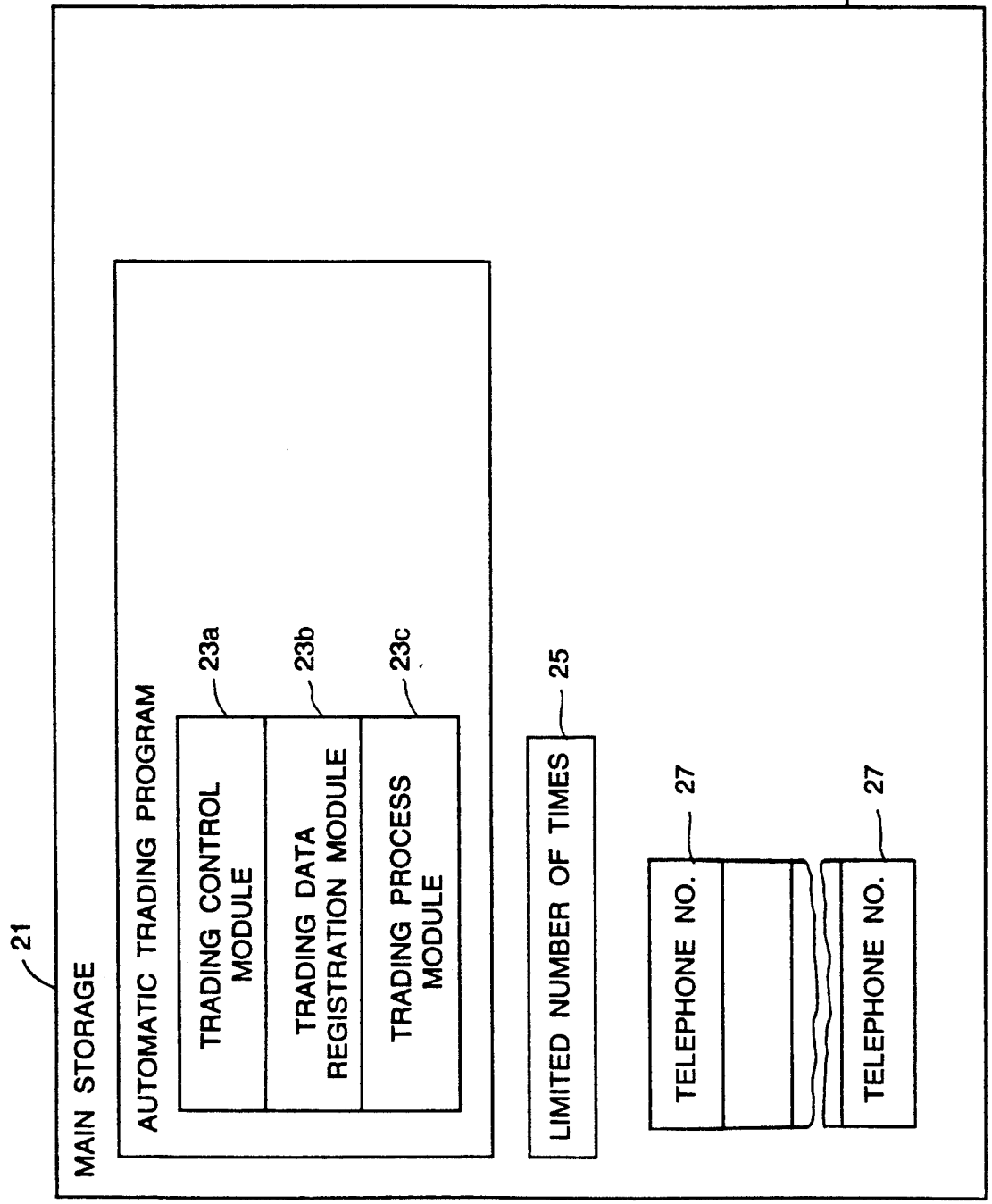

Referring now to the drawings where the showings are for purposes of illustrating preferred embodiments of the invention only and not for purposes of limitation, the FIGURES show an automatic trading method and apparatus with improved security features.

More specifically, FIG. 1A-C show a first embodiment of the present invention. The major feature of this embodiment is the contractor recognizing method. In an automatic trading method such as selling/buying, cancellation of a contract or changing of a trader relative to financial security papers such as stocks and various goods by means of some terminal device such as a telephone, a family computer, a personal computer and the like by way of the public communication circuit network, a first conventional contractor recognizing method is used by checking coincidence of the combination of a user code and a password assigned to the contractor that is transferred from the user at the request of the automatic trading with the combination previously recorded. If the trading is recognized to be the correct one then a second contractor recognizing method in accordance with the subject invention is proposed. In response to the request for the automatic trading, a message is automatically transferred including confirmation information relative to the request to a communication device such as a personal pager or "pocket bell" device of the contractor having a wireless signal receiving function and displaying function. In response to receipt of the signal the contractor can make a confirmation contact to confirm that he is the fair and proper user. The automatic trading can then be recognized to be correct. The communication device for the second contractor recognizing method may be any such device that has a wireless signal receiving function, a storing function of the content of the received signal and a reading out function. In this case display of the content of the received signal will be performed by another device from the device requesting the automatic trading. However, in the description hereafter, so as to make the description briefer, only a pocket bell device will be described, unless otherwise stated, as the communication device of the contractor to receive the wireless signal.

Accordingly in FIG. 1, 1 is a CPU (Central Processing Unit), 3 is a communication device to control transmission and reception of data between the CPU and a telephone group, and 5 is a telephone group by which the trading data or the confirmation data is transmitted or received by way of the public communication circuit network. The confirmation information is transmitted to a pocket bell device 13. Item 7 is a communication circuit network, typically the public communication circuit network, 9 is a terminal device such as a family computer, a personal computer and the like connected to the communication circuit network by way of telephones (hereinafter, it will be described as a family computer for brevity), and 11 is a pocket bell device calling apparatus by which a target pocket bell device is automatically called and a message is transmitted to the pocket bell device 13. The content of trading consists of symbols and numerical values 13a for showing the content of trading, and 13c is a confirmation symbol for confirmation contact by a user. Further, in the example of the pocket bell device 13, a telephone number 13b to be called by the contractor as the connection address for confirmation contact can be provided. With continued reference to the Figs., 15 is a first file in the case of a conventional automatic trading system in which correct trading data record 15a is registered, and this file is used as a data inputting file for the automatic trading process. Item 17 is a second file, which is newly provided by this invention, to temporarily register the trading data until the fairness of the request of the automatic trading is confirmed, and this comprises a first code 17a for identifying the contractor, confirmation information 17b, trading data 15a, and an illegality counter 17c (if necessary). Item 19 is a third file to store the user information which is set to each contractor. According to this embodiment, in addition to the first code 17a for identifying the contractor which is a combination of conventional user code and password for contractor, there are included the calling number 19a of a pocket bell device, a second code 19b for identifying the contractor, a meaning code 19c for showing its meaning or object, an invalid flag 19d, a reconfirmation amount of money 19e of the trading for showing the amount of money necessary to reconfirm by the pocket bell device, and the maximum amount of money 19f capable of performing the automatic trading in the third file. Item 21 is a main storage wherein 23 is an automatic trading program which comprises a trading control module 23a for program control, a trading data registering module 23b, and a trading process module 23c for conventionally performing the trading process. A maximum number value 25 of the illegal connection times for making the request of the automatic trading from the contractor invalid against the illegal confirmation contact is provided. Item 27 is a telephone number for a group of telephones to accept confirmation contact, and 28 is a reporting device to inform the matter to police in the case of illegal automatic trading. Further, the terminal device 9 may be a terminal device which is directly connected to a wireless or wired communication circuit without use of telephones, although in the following description only connection via telephones will be described.

A plurality of calling numbers 19a of a pocket bell device may be assigned to a single first code 17a for identifying the contractor. Similarly, plural combinations of the second code 19b for identifying the contractor and the meaning code 19c for showing a special meaning or object may be set. In this case, there are included at least one meaning code for ordinary trading, and another meaning code signifying that the contractor is being forced to trade by illegal compulsion. A description of inputting/outputting areas of each file and working area necessary to perform the program are omitted for avoiding undue complexity in this description.

Figure 2A:
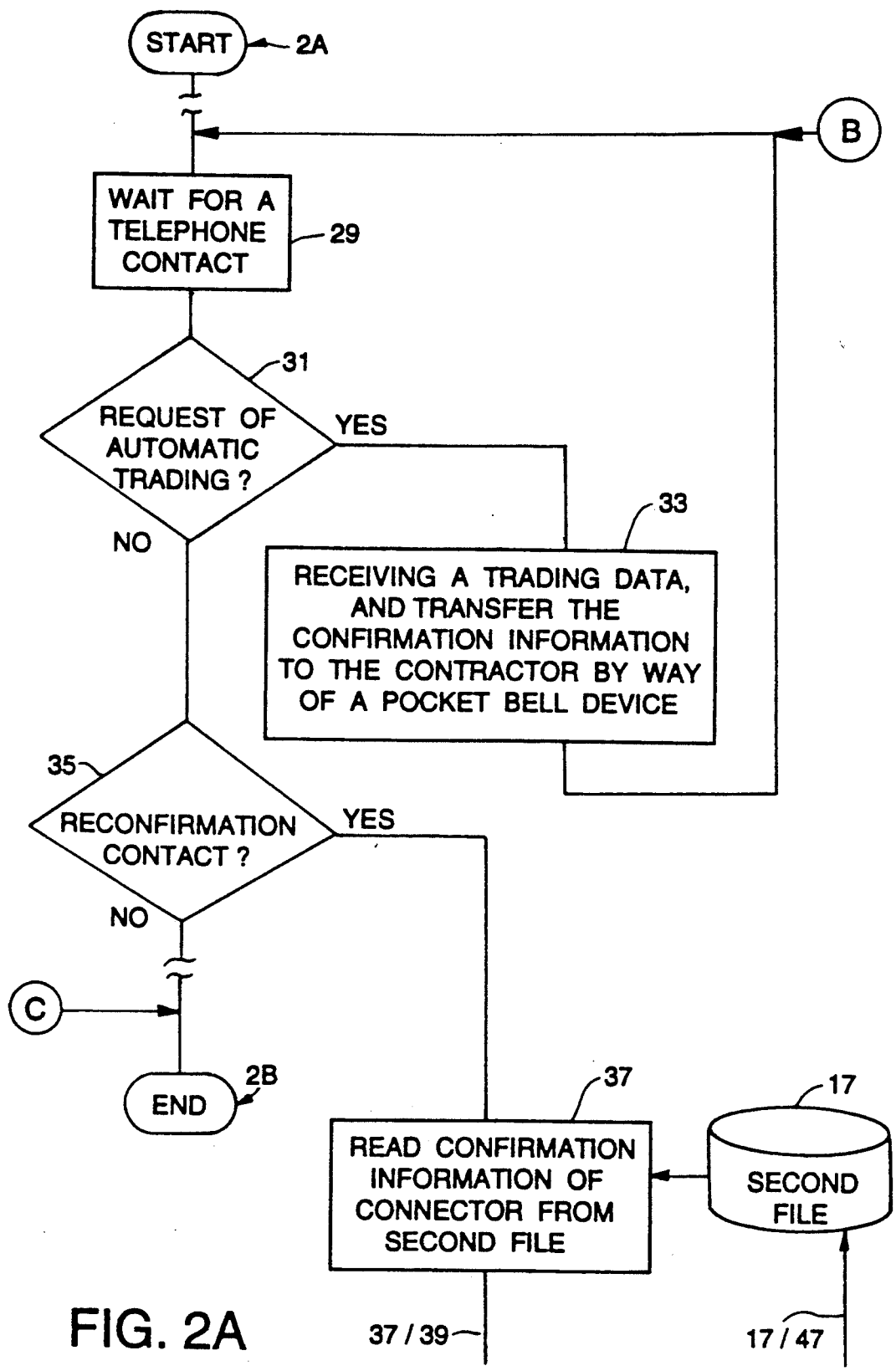
FIGS. 2A-B are a flowchart of process of the trading control module of the first embodiment.
Figure 2B:
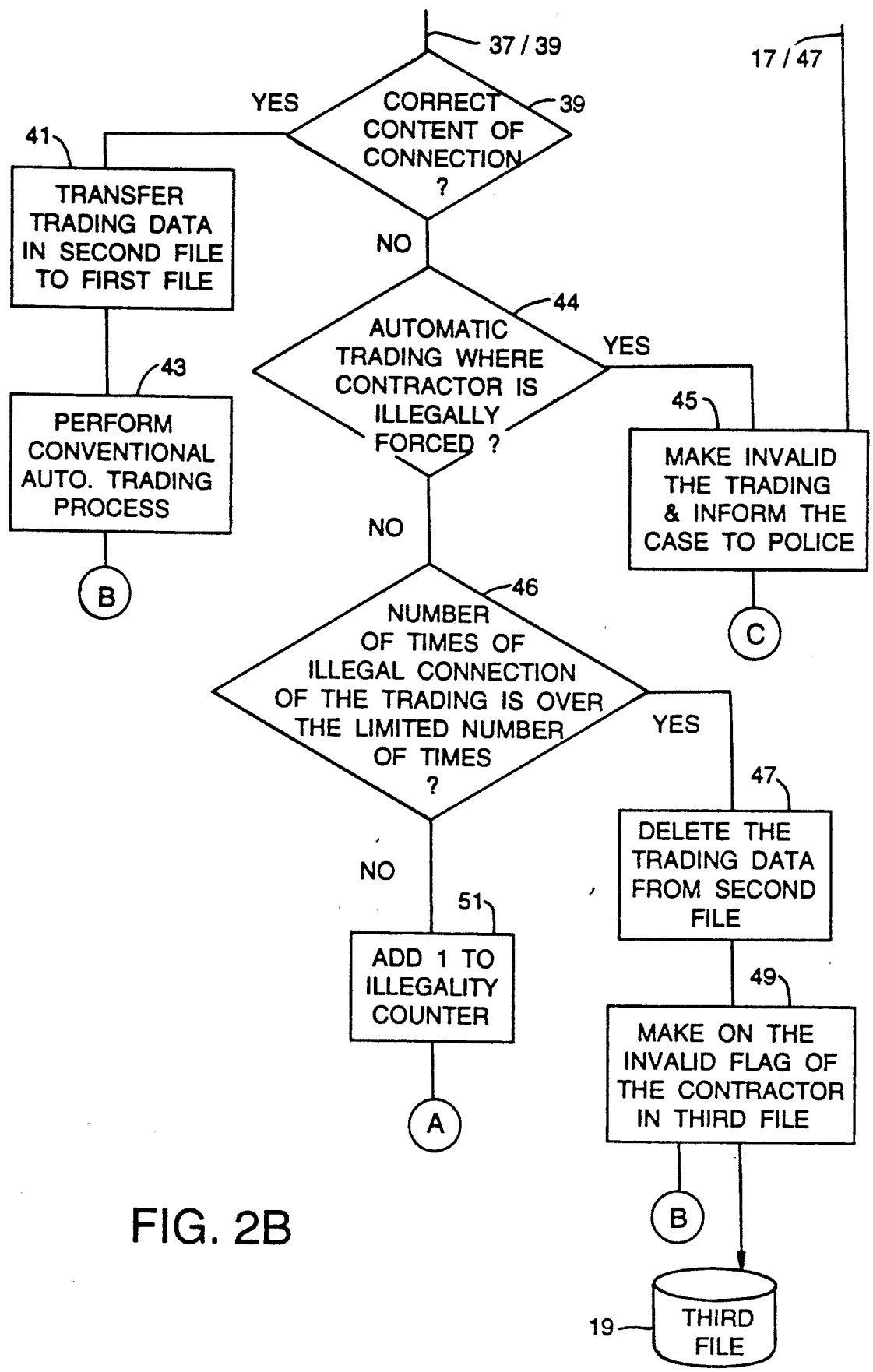

The content of processing of the automatic trading program will be described in detail by referring to FIGS. 2A-B.

Processing of the automatic trading program 23 is controlled by the trading control module 23a (FIG. 1A).

When started 2A, the trading control module 23a waits for the telephone contact for a request of automatic trading of stocks and the like from the user (step 29). Alternatively, the program may be started by a question from a terminal.

When the contact is made, then a decision must be made whether that contact is intended as a request for automatic trading (step 31). The decision may have to be made because the telephone number being used at the time of the request of the automatic trading is different from the telephone number at the time of reconfirmation contact, or on the basis that the symbol intended for the content of the request is transferred from the user. According to this invention, the decision method must specify that the telephone contact from the user is the request for automatic trading or the confirmation contact.

When the response is YES at step 31, the trading data registering module 23b is started, and the trading data, the confirmation information and the like are registered into the second file, and after the confirmation information is transferred to the contractor by way of the pocket bell device (step 33), the process loops back to the step 29. If plural calling numbers of the pocket bell device are assigned to the contractor, the confirmation information may be transferred simultaneously to each pocket bell device, or another pocket bell device may be called sequentially when no reconfirmation contact is made for a determined time period.

When the response is NO at the step 31, it is decided whether the telephone contact is the reconfirmation contact from the user relative to the confirmation information of the pocket bell device (step 35). When the response is YES at the step 35, the confirmation information to the connector is read out of the second file by means of using the first specified code of the contractor being contacted as its key (step 37), and then it is decided whether the connected content matches the confirmation information registered in the second file relative to the request of the automatic trading (step 39). Here, as for the deciding method, in the case of transmitting the telephone number for confirmation contact to the pocket bell device, it may be decided by the fact that the telephone contact was made to the telephone having the corresponding telephone number; it may be decided by the fact that the confirmation symbol transmitted to the pocket bell device was agreed; or it may be decided by the fact that the meaning code indicated the request for normal automatic trading by communicating the specified code of the contractor which was previously set. Furthermore it may be decided by a combination of these deciding methods. Although there are several other processes incidental to the ending request of the program, such as processes relative to error and the like, similar to the processes regarding NO response in the case of step 35, description of these processes is omitted since they are conventionally known and not essential matters of this invention. When the response is YES at the step 39, the automatic trading request data in the second file is transferred to the first file (step 41), and then the trading module 23c performs the conventional process of the automatic selling/buying trading (step 43). Since the conventional processing method of the automatic trading is not the target of this invention, the description thereof is also omitted.

When the response is NO at the step 39, it is decided whether the meaning code 19c of the second contractor identifying code communicated indicates whether the automatic trading by the contractor is illegally forced or not (step 44). When the response is YES at the step 44, the trading data in the second file relative to the request of the automatic trading is made invalid by deleting thereof, and together with this process, the matter is automatically reported to police (step 45), and then the process is terminated.

When the response is NO at the step 44, it is then decided whether the illegal number of times of contact for this order exceed the limited number of times 25 previously set or not on the basis of the illegality counter 17c (step 46).

Here, the limited number of times 25 may be decided beforehand, or may be set by an operator of a computer system. When the response is NO at the step 46, 1 is added to the illegality counter (step 51), and then the process following step 66 is performed. When the response is YES at the step 46, the request of the automatic trading is deleted from the second file, and the request of the automatic trading is made invalid (step 47). Further, the invalid flag of the contractor in the third file is made ON (step 49), and then the process following step 29 is performed. In the step 49, the information relative to the contractor may be deleted from the third file. In this case, it is not necessary to decide the state of the invalid flag by the deciding process in the step 56 to be described hereinafter.

Figure 3A:
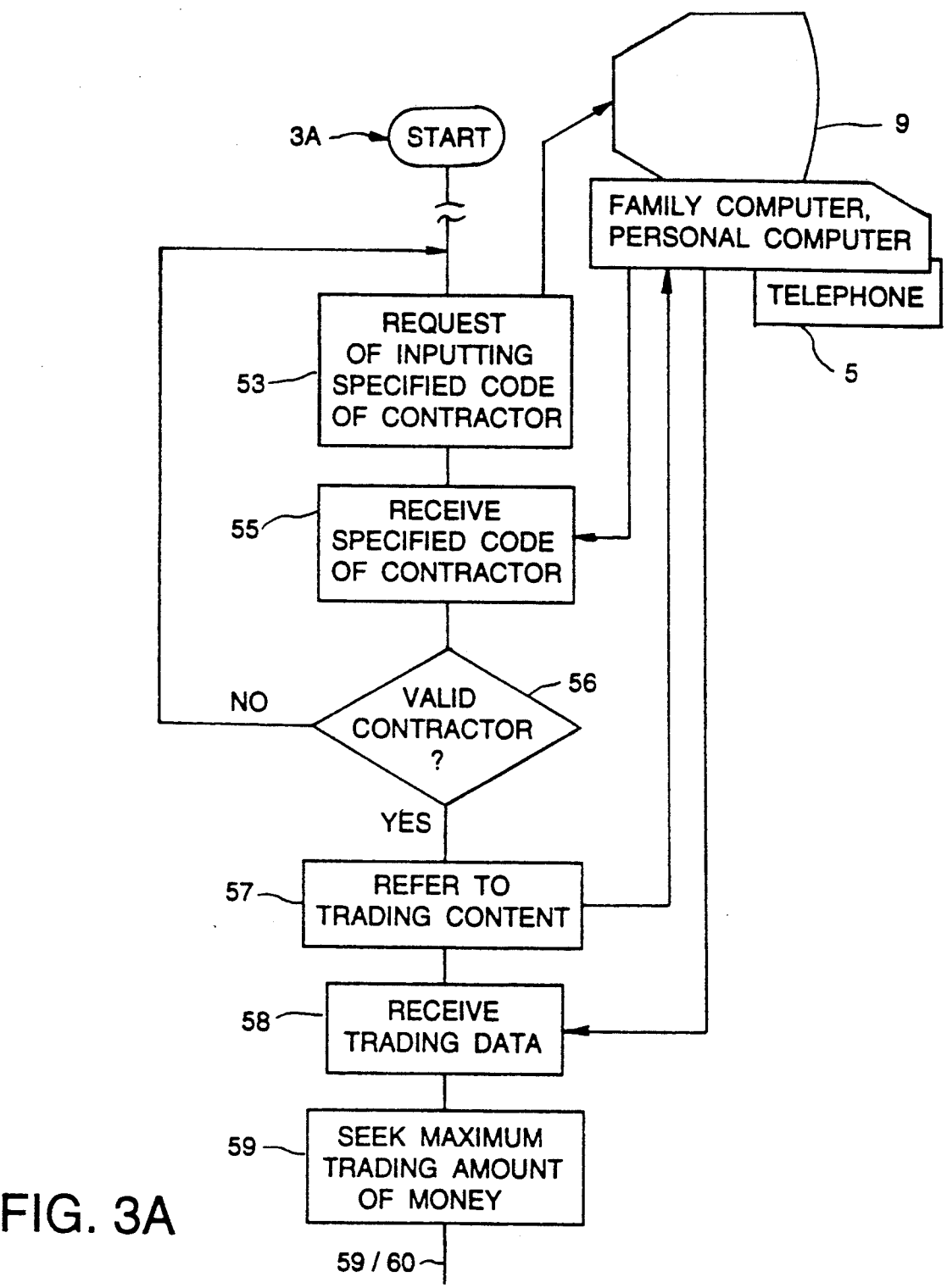
FIGS. 3A-B are a flowchart of process of the trading data registering module of the first embodiment.
Figure 3B:
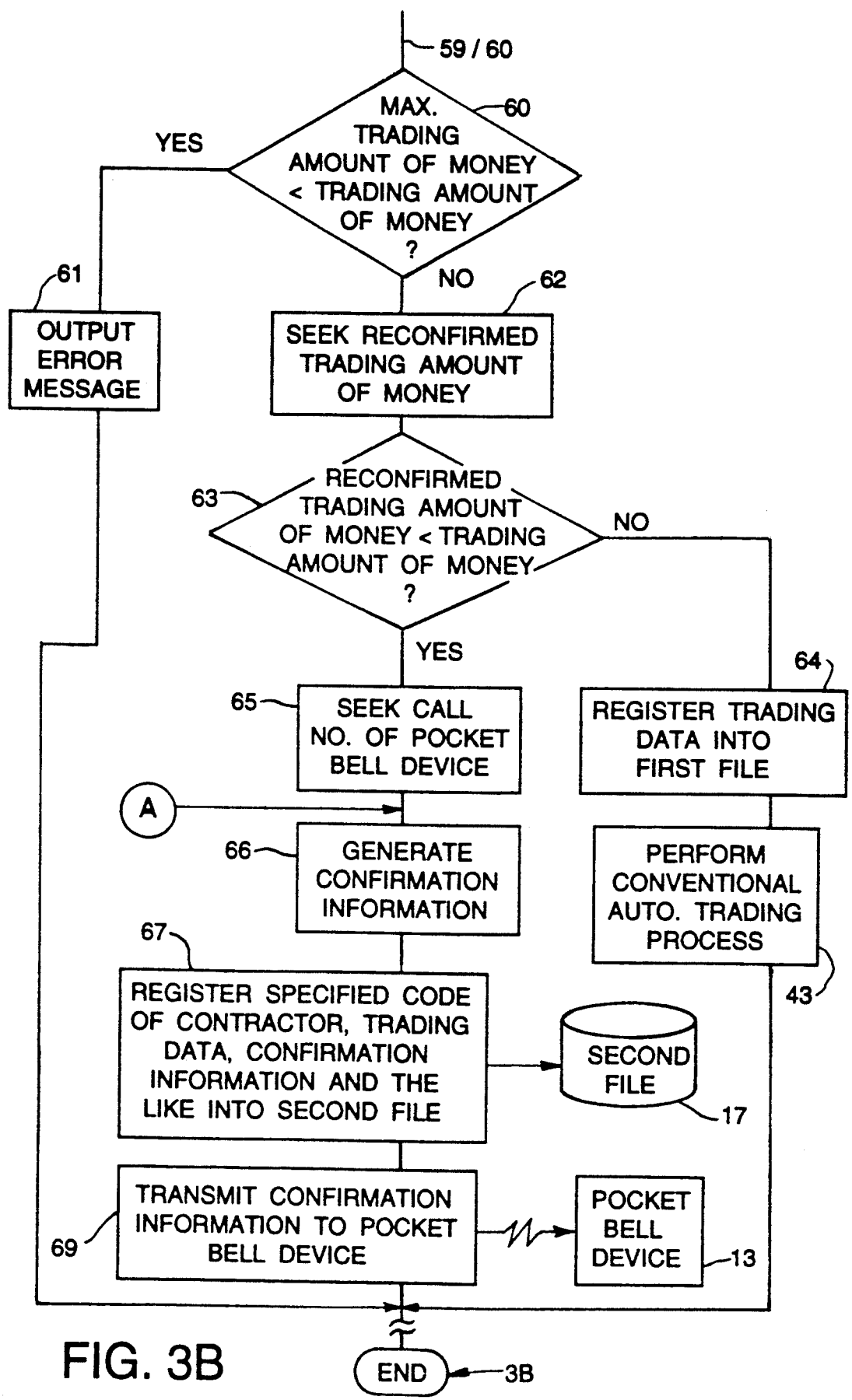

Next, the operating process of the registering module 23b in a request for automatic trading in said step 33 will be described in detail on the basis of FIGS. 3A-B.

When this module is started, in order to identify a contractor, a request is issued to a user for inputting a user code and password consisting of a first specified code of the contractor (step 53), and said information is received (step 55). The first specified code of the contractor is employed as a key to search the third file, where it is decided whether the contractor with the combination thereof exists and also if the invalid flag is OFF or not (step 56). When the response is NO at the step 56, the process following step 53 is performed. This is a first contractor identifying method to identify a contractor which was conventionally performed.

As another embodiment of this first contractor identifying method, the following method may be employed; namely, that the first specified code consists of user code only, and that inputting of the user code is required at step 53, and the third file is searched by employing the user code as the key, and then it is decided whether the contractor identified by the user code exists and also if the invalid flag is OFF or not at step 56.

Further, the following method may also be employed; namely, a telephone is limited to the telephone used by a user and the telephone number of that telephone is made to be a first code, and inputting of the user code is not required at step 53, and the telephone number of the telephone being used by the user is sought to be considered as the first specified code.

When the response is YES at the step 56, a content of the request of the automatic trading is inquired (step 57), and the content of order comprising the trading data is received (step 58).

The maximum amount of money 19f of the trading is obtained from the record in the third file which matches the first specified code of the contractor (step 59), and it is decided whether that amount money is smaller than the amount of money of the trading ordered or not (step 60).

When the response is YES at the step 60, an error message is issued informing that the amount of money of the automatic trading exceeded the maximum amount of money of the trading (step 61), and the process of the registering module 23b of the request the automatic trading is terminated. Further, the content of the trading may be inquired again as another embodiment.

When the response is NO at the step 60, a reconfirmation amount of money 19e of the trading is obtained from the record in the third file which matches the first specified code of the contractor (step 62), and it is decided whether that amount of money is smaller than the amount of money of the trading ordered or not (step 63).

When the response is NO at the step 63, a content of the order is registered into the first file as the trading data (step 64), and the conventional process of the request of the automatic trading is performed (step 43), and thus process of the registering module 23b of the request of the automatic trading is terminated.

When the response is YES at the step 63, the calling number of the pocket bell device of the contractor is obtained from the record in the third file which matches the first specified code of the contractor (step 65). Next, the confirmation information consisting of the telephone number of contact destination to be transmitted to the pocket bell device, the confirmation symbol and the like is provided (step 66). In the case of including the telephone number for destination as the confirmation information, some telephone number may be randomly selected from the telephone number group 27 of telephones capable of receiving the reconfirmation connection from the contractor who received the calling of the pocket bell device, or alternatively a flag column is added to each telephone number so as to select an unused one from the using flag. In the latter case, however, when the connection is made at said step 29, the using flag is made ON, and when the telephone is disconnected at the steps 33, 43, 49 and the like the using flag of that telephone is made OFF.

In the case of including the confirmation symbol as the confirmation information, it may be consisted of a randomly generated number, character and the like, and also the selecting may be performed from a predetermined symbols. However, in the case of accepting plural requests of the automatic trading to the same contractor, it is of course necessary to search the second file, and to search whether other requests of the automatic trading having the first specified code of the same contractor exist, and to confirm that the confirmation information is different from the confirmation information now generated. Further, the following embodiment may be also available; namely, at least two confirmation symbols capable of separating the case of actually performing the trading from the case of making the trading invalid. The first specified code of the contractor, the trading data, the confirmation information such as the telephone number transmitted to the pocket bell device, the confirmation symbol, the second specified code of the contractor, the meaning code thereof and the like are registered (step 67), and the symbol, numerical value and confirmation information indicating the content of the request of the automatic trading is transmitted to the pocket bell device (step 69), and then the process of the module is terminated.

According to this embodiment, even if a specified first code of a contractor is known by someone other than the contractor, any request of automatic trading is not realized without reconfirmation contact by way of a pocket bell device. Accordingly, since any automatic trading by an illegal contractor feigning a real contractor is not accomplished when the real contractor does not know the matter, and the reliability of the trading is improved. Further, in the case of making reconfirmation contact, an illegally forced trading can be detected by a second contractor specified code, a disadvantageous trading to the contractor can be prevented, and also the matter is automatically reported to the police to protect the contractor.

The invention encompasses a flexibility such that when the amount of money of the ordered trading is smaller than the amount of money indicated by the user, only the first user recognizing method is applied in the case of small money trading, by means of suppressing the reconfirmation contact by way of the pocket bell device.

Furthermore, the following simplified trading method can be also realized; namely, that the first user recognizing method is not applied, and the order of trading is performed by an open terminal with a recognizing method consisting of only the second contractor recognizing method, and the contractor's pocket bell device is employed.

Figure 4B:
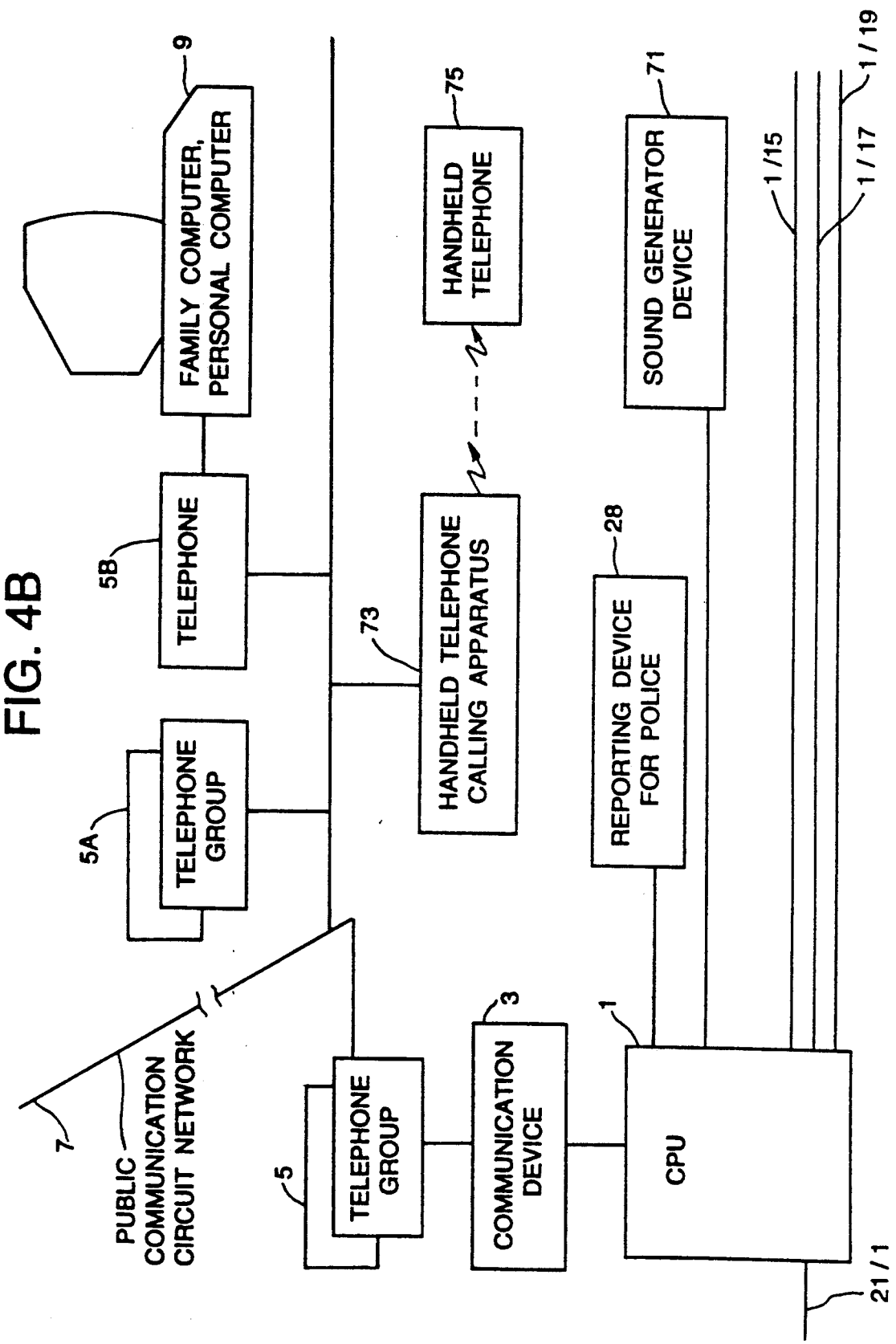
Figure 4C:
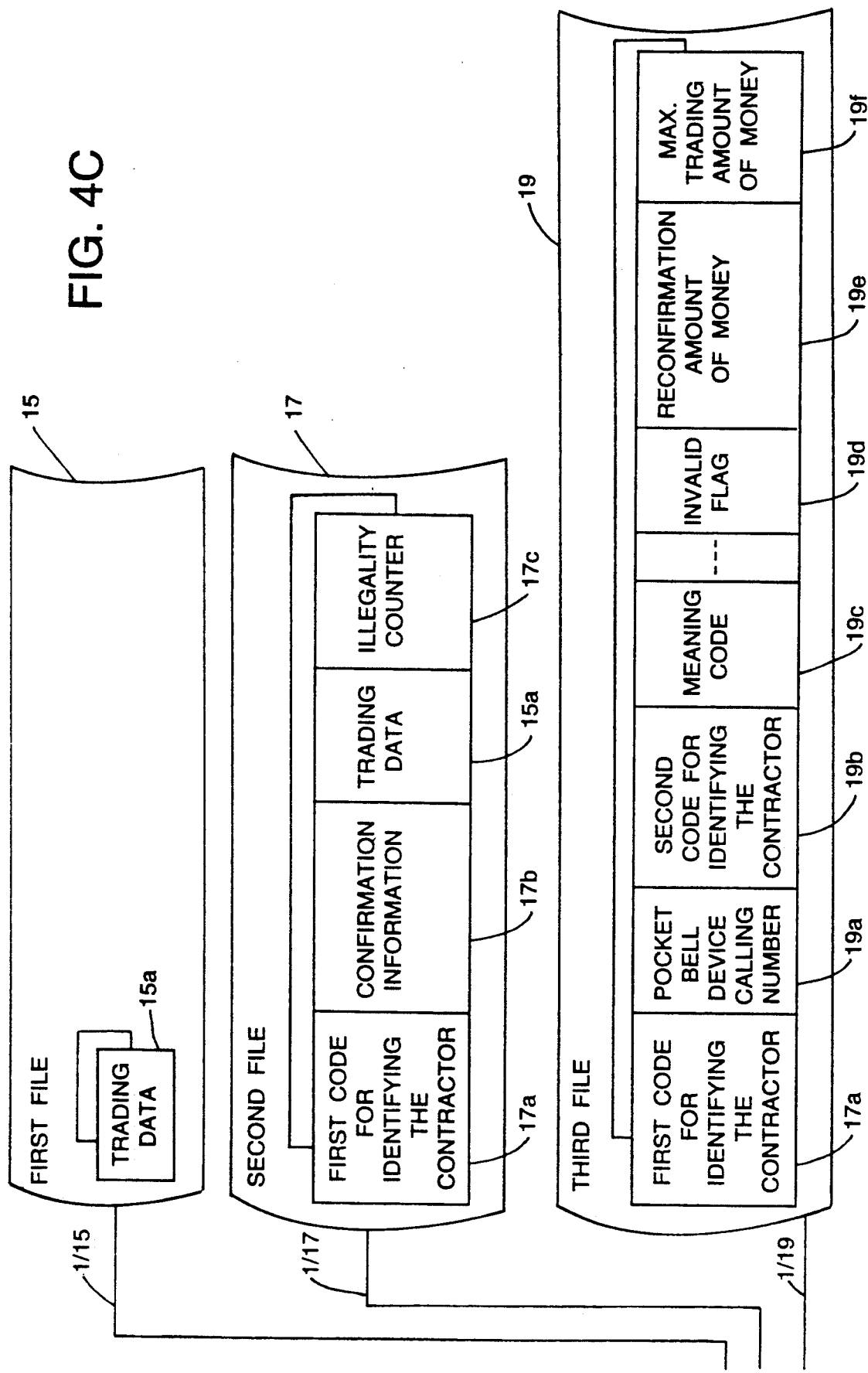

Now, another second embodiment of this invention will be described with reference to FIGS. 4A-C which show a whole assembly of the embodiment. In these and all subsequent Figs., common elements of the assembly share common reference numerals with the first or other embodiments.

The most important feature of the second embodiment is a symbol and numerical value indicating the content of the request of the automatic trading, a telephone number of destination for contact, and a confirmation symbol are automatically transmitted to a contractor telephone having a wireless signal receiving function such as a handheld telephone, a movable telephone and the like (hereinafter, this is described as a handheld telephone for the purpose of brevity), and therefore, the confirmation information is necessary to be converted from the character data form capable of being recognized with the eyes of the contractor (pocket bell device) to audio data form capable of being recognized with the ears of the contractor.

In the Figs., 70 is an automatic trading request program which comprises an automatic trading request control module 70a for entirely controlling, an automatic trading request registering module 70b, and a trading process module 23c by which a conventional trading process was performed based on an automatic trading request. 71 is an audio generator device by which the following can be generated: a symbol and numerical value indicating the content of a request for automatic trading to be transmitted to a handheld telephone, a telephone number of communication of contact confirmation, and a confirmation symbol of character data form which is normally recognizable by the eyes of a contractor is converted to the audio data form capable of being recognized by the ears of the contractor. 73 is a handheld telephone calling apparatus for automatically calling the target handheld telephone so as to transmit a message, 75 is a telephone having a wireless signal receiving function such as a handheld telephone or a movable telephone. The type of equipment and method for converting from character data to audio data is not a problem.

The construction of the other equipment that is similar to that in the case of the first embodiment is the same as therein, and is therefore omitted from this description for brevity.

Still further, similar to the case of the first embodiment, a description with respect to the inputting/outputting area between each file and the working area in the main storage necessary to perform program is also omitted.

Figure 5A:
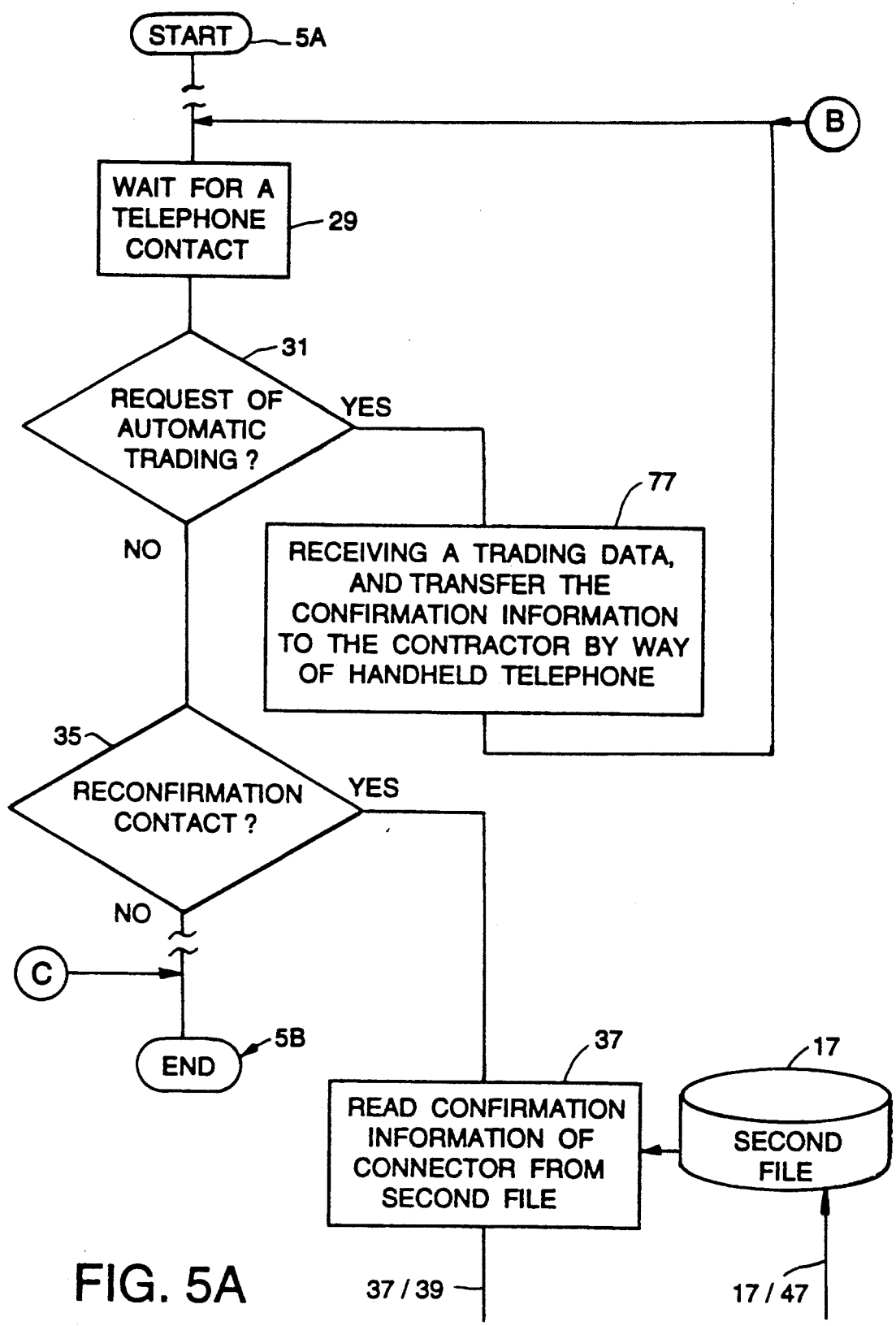
FIGS. 5A-B are a flowchart of process of the trading control module in the case of the second embodiment.
Figure 5B:
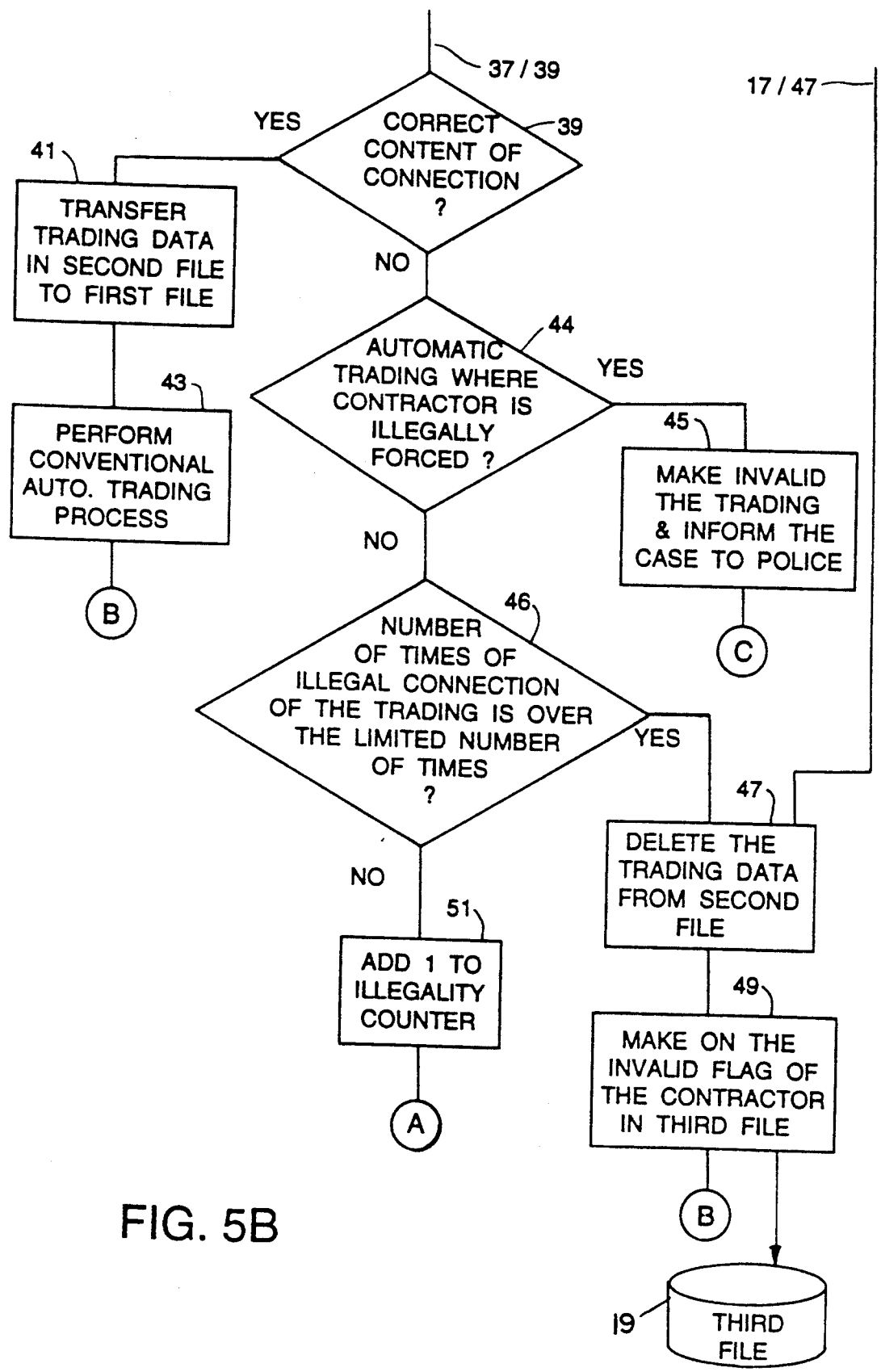

The process of the automatic trading program 70 is described with reference to FIGS. 5A-B. The automatic trading program 70 is controlled by a trading control module 70a. The difference between this trading control module 70a and that of the trading control module 23a in the first embodiment is a recognizing process by a contractor where instead of transmitting the confirmation information to a pocket bell device it is changed to transmitting the confirmation information to the contractor's own telephone.

Accordingly, when the response is YES at the step 31, a trading data registering module 70b is started to register the trading data into a second file, and the confirmation information is transmitted to the contractor by way of the handheld telephone (step 77), and then the process of steps following step 29 is performed.

Further, similar to the case of the first embodiment, since the trading process module 23c is the same as the trading process method of the conventional automatic trading, according to this invention, there is no special limitation about practicing the method.

Figure 6A:
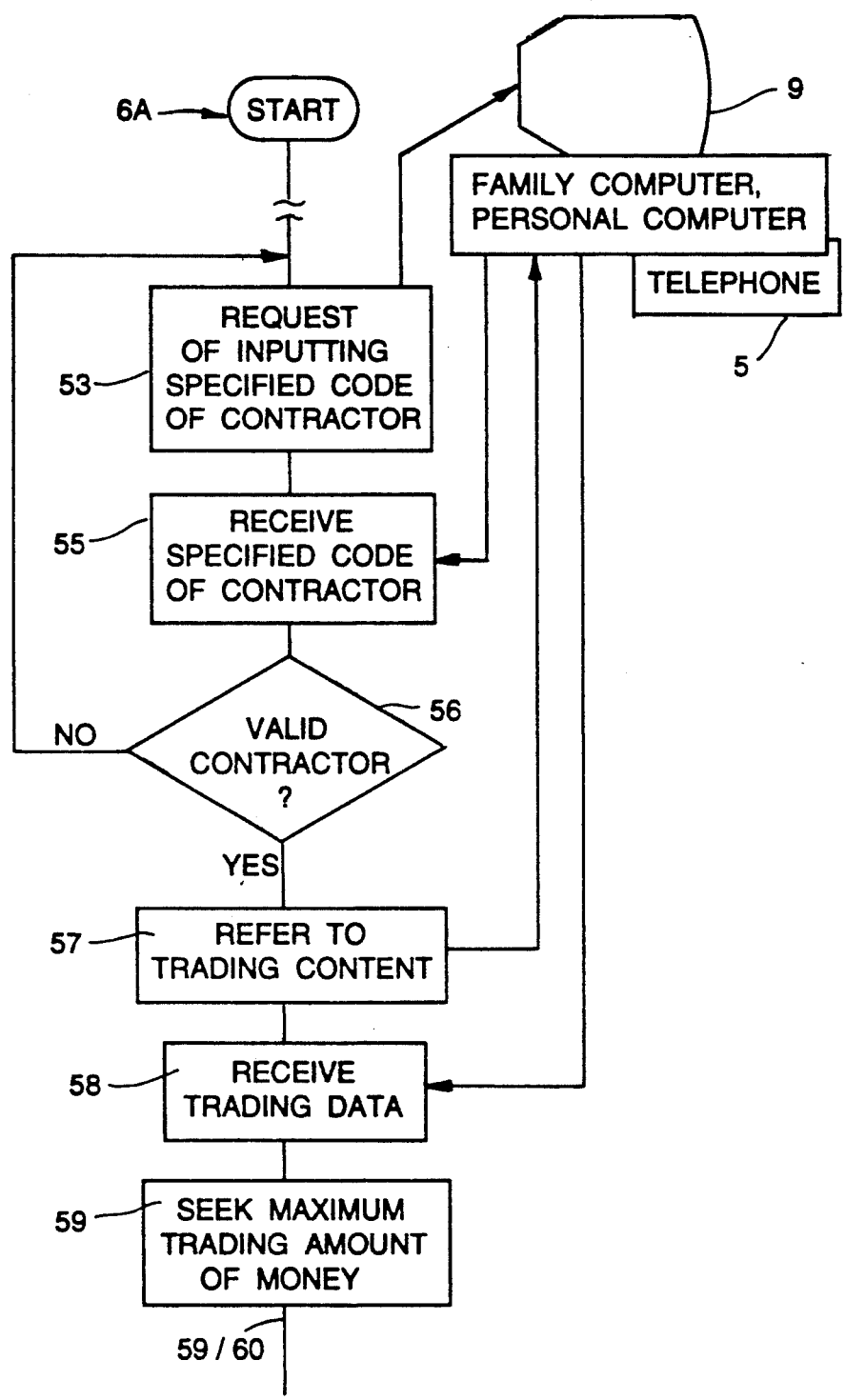
FIGS. 6A-B are a flowchart of process of the trading data registering module in the case of the second embodiment.
Figure 6B:
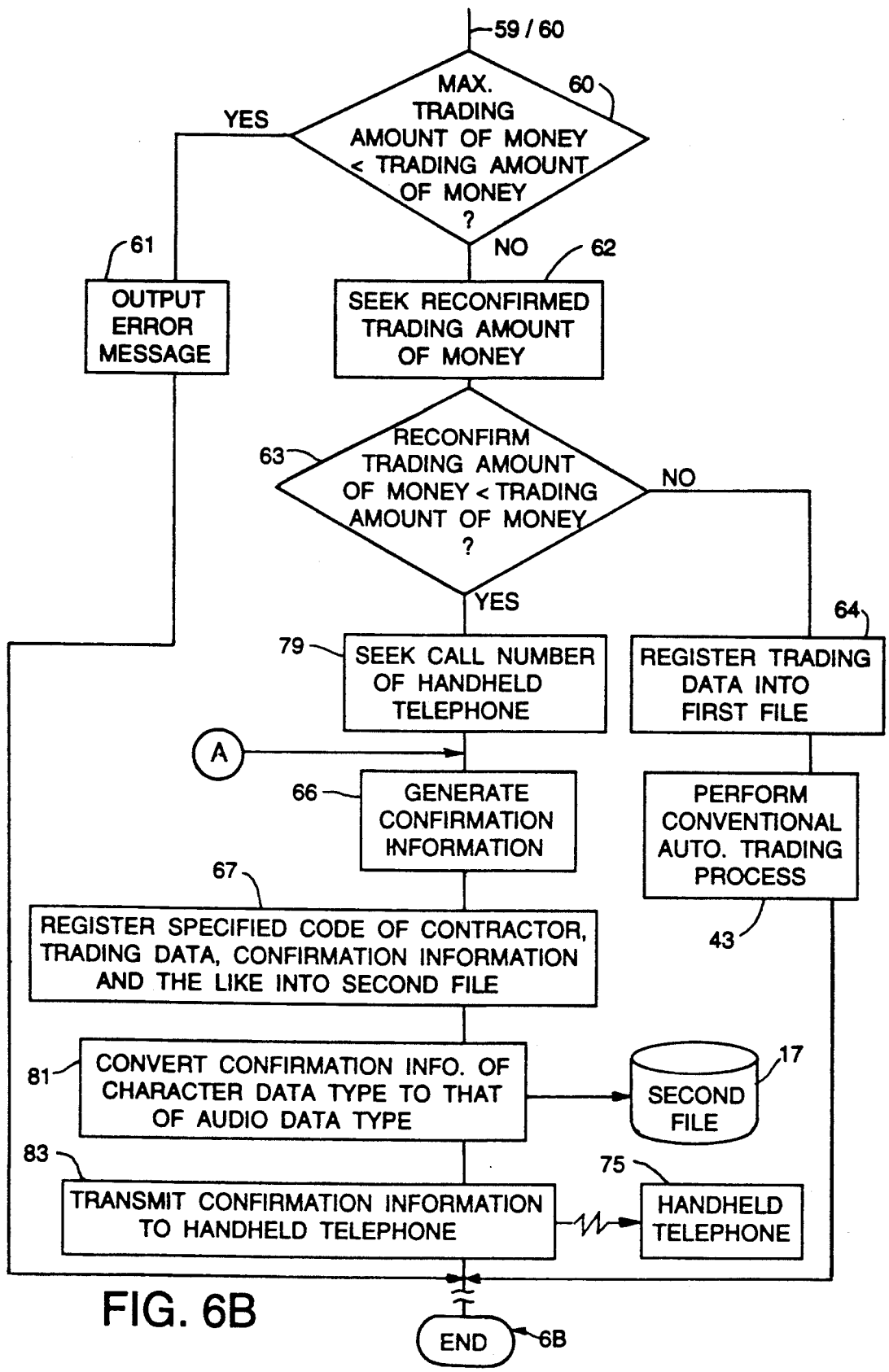

The process of the trading data registering module 70b in the case of the step 77 will be described in detail with reference to FIGS. 6A-B.

The content of process of the module is also similar to that of the trading data registering module 23b of the first embodiment. However, there is the difference in that a symbol and numerical value indicating the content of the request of the automatic trading to be transmitted to a handheld telephone, a telephone number of destination for contact, and a confirmation symbol of character data form, must all be converted to audio data form (step 81), and then transmitted to the handheld telephone (step 83). However, the same effects as the first embodiment can be obtained.

Figure 7C:
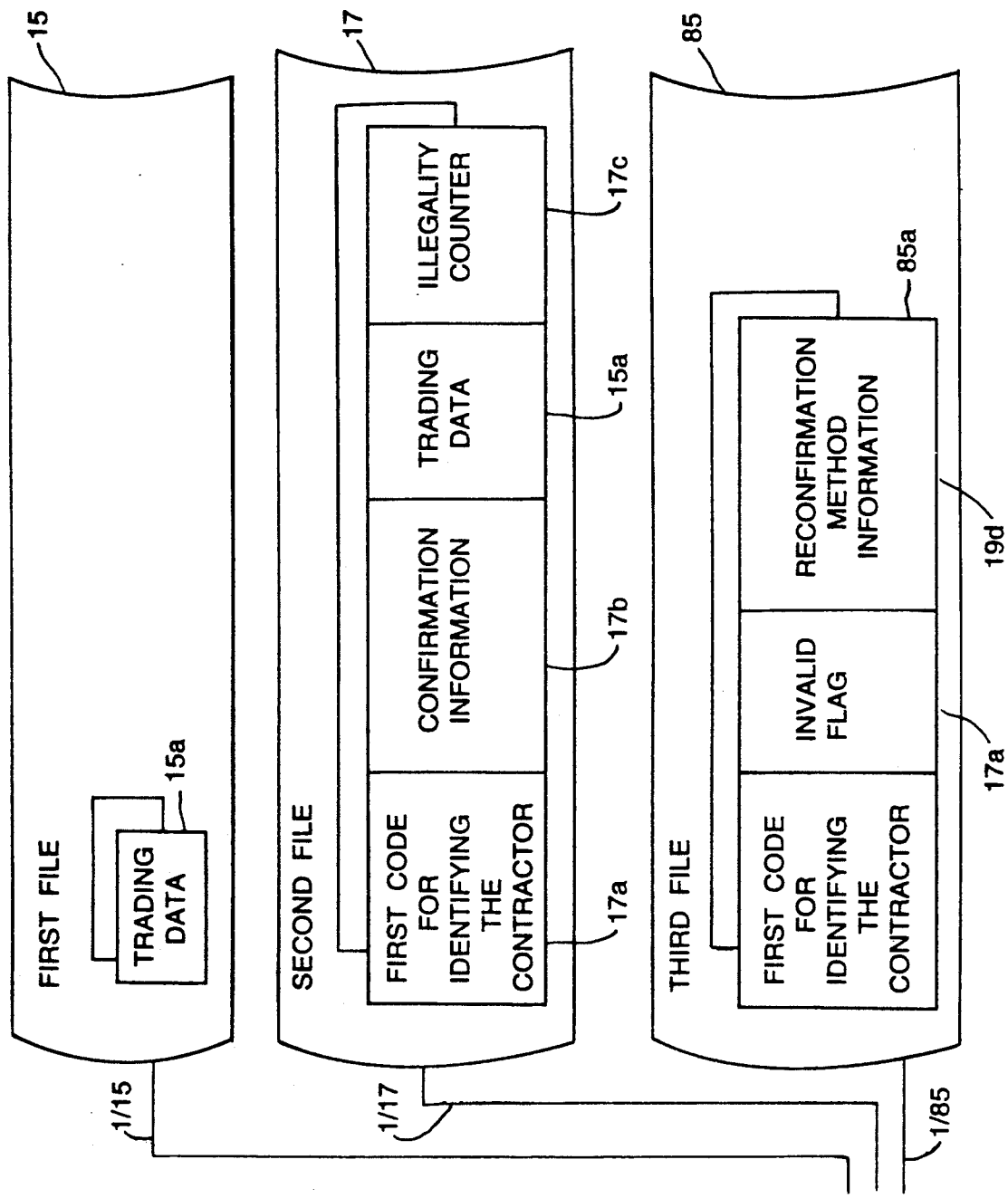

Now, another embodiment of this invention will be described. FIGS. 7A-C is a whole constructional assembly figure of this embodiment.

The most important feature of this embodiment is that a predetermined recognizing method is automatically selected from a method of confirming the content of trading by a route different from the route in which the trading order is made and wherein a digital signature, or a method of employing a voiceprint, fingerprint, blood vessel pattern of retina is used as the recognizing method of the person in question.

In the Figs., 85 is a third file to store user information set to each contractor. According to this embodiment, the third file includes a record group comprising an invalid flag 19d and a reconfirming method information 85a in addition to the conventional combination of user code and password described as a contractor specified first code 17a.

The reconfirming method information 85a is shown in detail in FIG. 8. At the time of the reconfirming, the information comprises information relative to the range of the amount of money of trading 85a-1, a pocket bell device calling number 19a, a contractor specified second code 19b and a meaning code 19c thereof. At the time of the reconfirming method, information relative to the range of the amount of money of another trading 85a-2; for example, in the case of employing the digital signature, it comprises a digital signature code 85a-3; and at the time of the reconfirming method information relative to the range of the amount of money of still another trading 85a-4; for example, in the case of employing the confirming method by fingerprint data, it consists of the fingerprint data 85a-5. Similar methods are applicable to the case of employing a voiceprint, a blood vessel pattern of a retina, or the blood type as the confirming data.

With reference to FIGS. 7A-C, Item 87 is an input device of a digital signature code from an electronic device such as an IC card in which the digital signature code is stored.

Item 89 is a specialized input device for the confirming data of the person in question such as fingerprint, voiceprint, blood vessel pattern of retina, blood type and the like or an electronic device such as an IC card in which this data is previously stored.

Item 91 is a verification unit of the confirming data of the person in question such as fingerprint, voiceprint, blood vessel pattern of retina, blood type and the like.

Item 93 is a verification unit of the digital signature code.

Item 95 is an automatic trading program comprising an automatic trading control module 95a for overall control, an automatic trading registering module 95b and a trading process module 23c by which the conventional automatic trading process is performed.

Since the construction of the other equipment is similar to that of the first embodiment, the description thereof is omitted. However, there is also set in addition to the confirmation information as in the case of the first embodiment, the confirming code of the person in question such as the voiceprint code, the fingerprint code or the digital signature code and the like into the confirmation information 17b in the second file 17 based on the second confirming method employed.

The actual composition of the confirming code of the person such as the voiceprint, fingerprint and the like and the verifying method thereof, and the construction of the digital signature, ciphering method, decoding method and verifying method is accomplished within the scope of conventional methods and is not a problem that is addressed by the present invention.

A detailed description of the inputting/outputting area of each file and the working area in the main storage necessary to perform the programs is also omitted so as to avoid unnecessary complexity of this description.

Figure 9A:
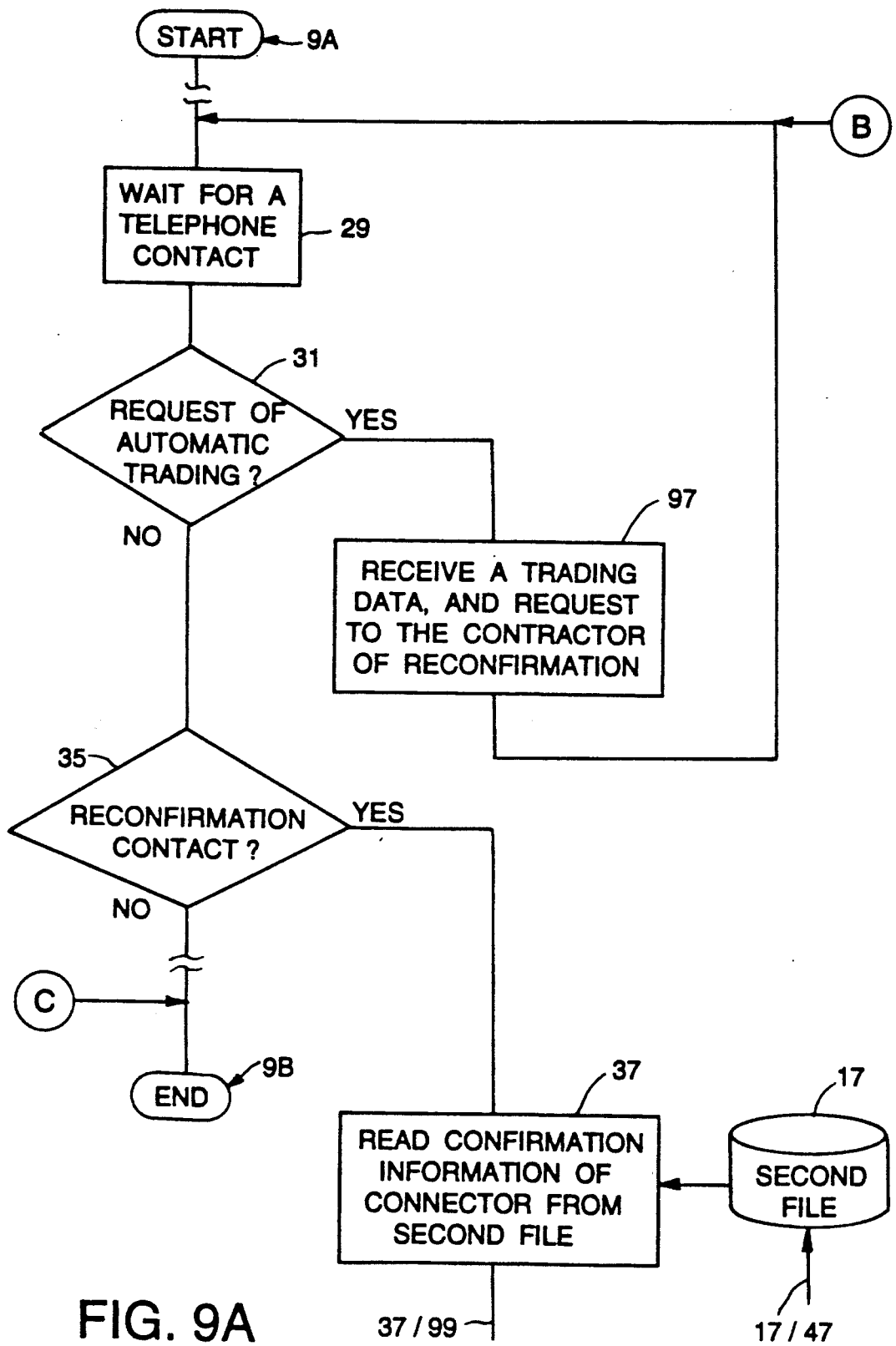
FIGS. 9A-B are a flowchart of a process of the trading control module in the case of the third embodiment.
Figure 9B:
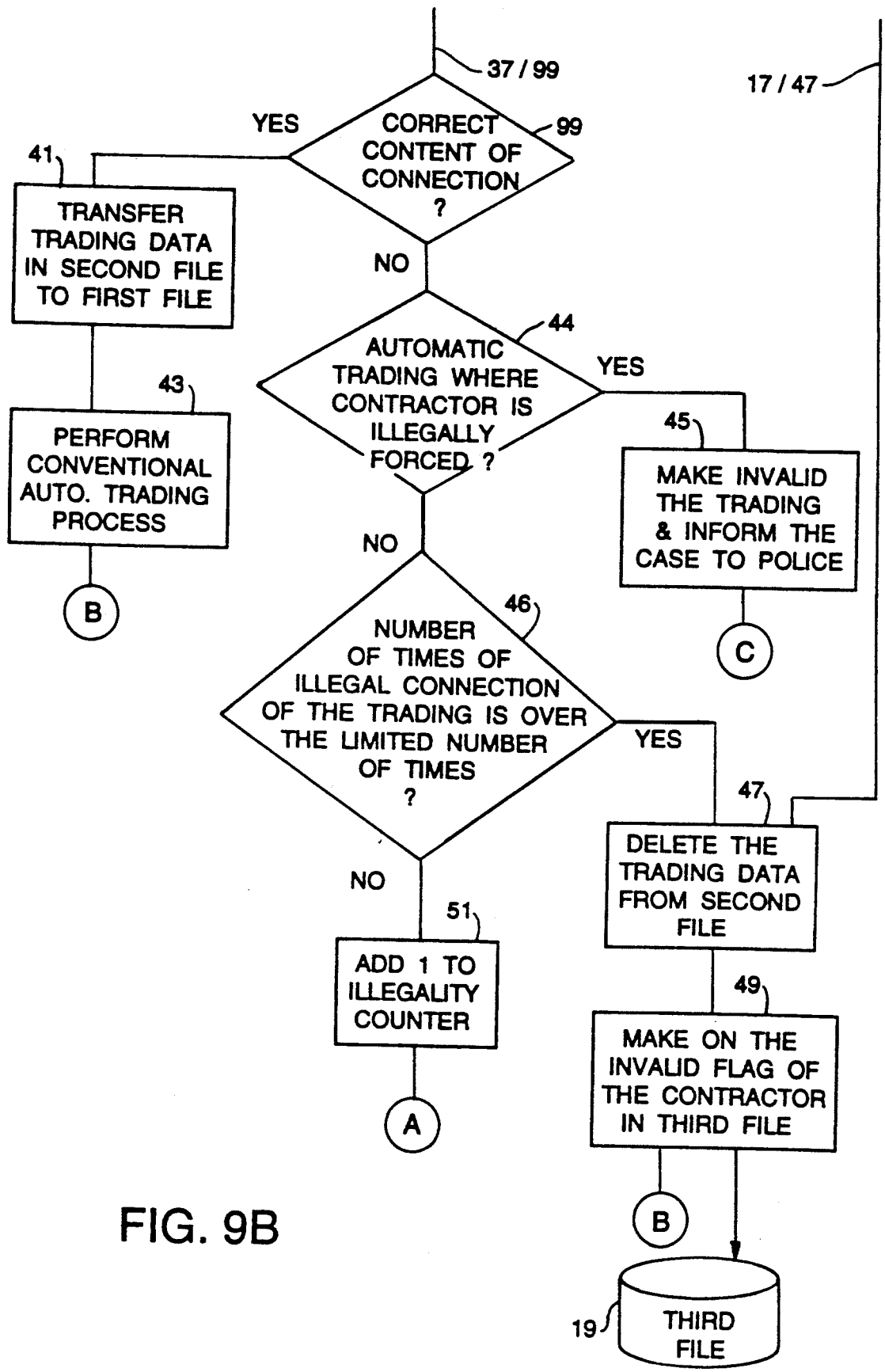

The content of the automatic trading program 95 will be described with reference to FIG. 9.

The process of the automatic trading program 95 is controlled by a trading control module 95a.

When the content of process of the trading control module 95a is compared with that of the trading control module 23a in the case of the first embodiment, the difference is that the second contractor recognizing method is also determined depending on the personal verification information comprising fingerprint and the like or digital signature.

Accordingly, when the response is YES at the step 31, the trading data registering module 95b is started to register the trading data into the second file, and after transmitting to the contractor a message for the second contractor recognizing method depending on the personal verification information (step 97, FIG. 9A), the process of steps following step 29 is performed. Therefore, in the case of step 99, in addition to deciding whether the connection content is correct as in the case of step 39 of the first embodiment, the following process is also performed. The amount of money involved in the trading request must be within a prespecified range.

Further, since the trading process module 23c is similar to the trading process method of conventional automatic trading, this invention is not limited by conventional methods.

Figure 10B:
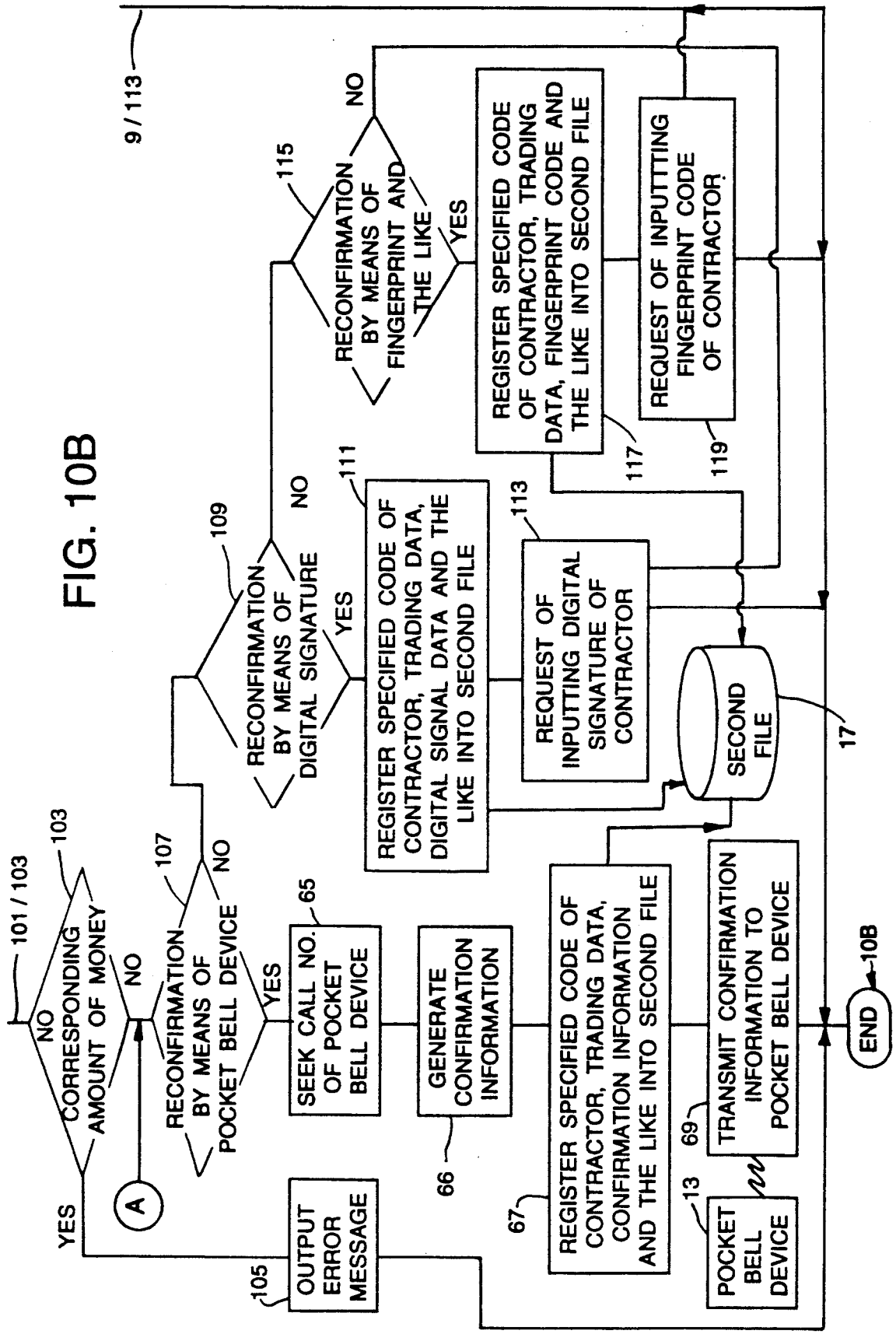

The process of the trading data registering module 95b (FIG. 7A) of step 97 (FIG. 9A) will be described in detail with reference to FIG. 10.

The process of this module 95b is also similar to that of the trading data registering module 23b of the first embodiment, until the step 61 to receive the trading data.

At step 101, the amount of money in the trading is obtained from the trading data, and it is checked to determine if it falls within the allowable amount of money which can be traded that is contained in the reconfirming method information 85a (FIG. 8). When there is a failure of correspondence (step 103), an error message is output and the process of the trading data registering module 95b is terminated. When there is a correspondence signifying an approved amount, a decision is made whether it is the confirmation by the pocket bell device or not (step 107). When the response is YES at the step 107, similar to the case of the first embodiment, steps 65, 66, 67, 69 are performed. When the response is NO at the step 107, a decision is made whether it is the reconfirmation by the digital signature (step 109). When the response is YES at the step 109, the first specified code, of the contractor, the trading data, and the confirmation information comprising the digital signature data and the like are registered into the second file (111), and the input of the digital signature is required of the contractor (113), and thus the process of the module is terminated. When the response is NO at the step 109, a decision is made whether it is the proper reconfirmation by the confirming method of the person in question (step 115). When the response is YES at the step 115, the first specified code of the contractor, the trading data, and the confirmation information consisting of the fingerprint code and the like are registered into the second file (117), and the input of the fingerprint code and the like is required to the contractor (119), and thus the process of the module is terminated.

When the range of the amount of money for trading is a part of the reconfirming method by means of the pocket bell device and it is superposed on that of another reconfirming method, it is of course also able to complete the tasks of that method such as confirming the digital signature, fingerprint and the like to the contractor by way of the pocket bell device. Furthermore, assigning some one from a plurality of digital signatures previously determined by way of the pocket bell device is also available.

According to the third embodiment, since the second contractor recognizing method can be variously selected depending on the amount money of trading, it need only be implemented for large money amounts. Namely, when the amount of money of trading is small, a second contractor recognizing method is applied which is easily operated by the contractor, and when the amount money of trading is large, a second contractor recognizing method is applied which is complex in operation, but is highly reliable.

The third alternative embodiment FIG. 7A-C thus provides improved security over the trading data and improved verification of the identity of the authorized contractor. The trading data registering module 95b provides for improved control over the amounts of money to be transferred in the automatic trading and the trading control module 95a provides for improved and more secure personal verification of the contractor.

Figure 11A:
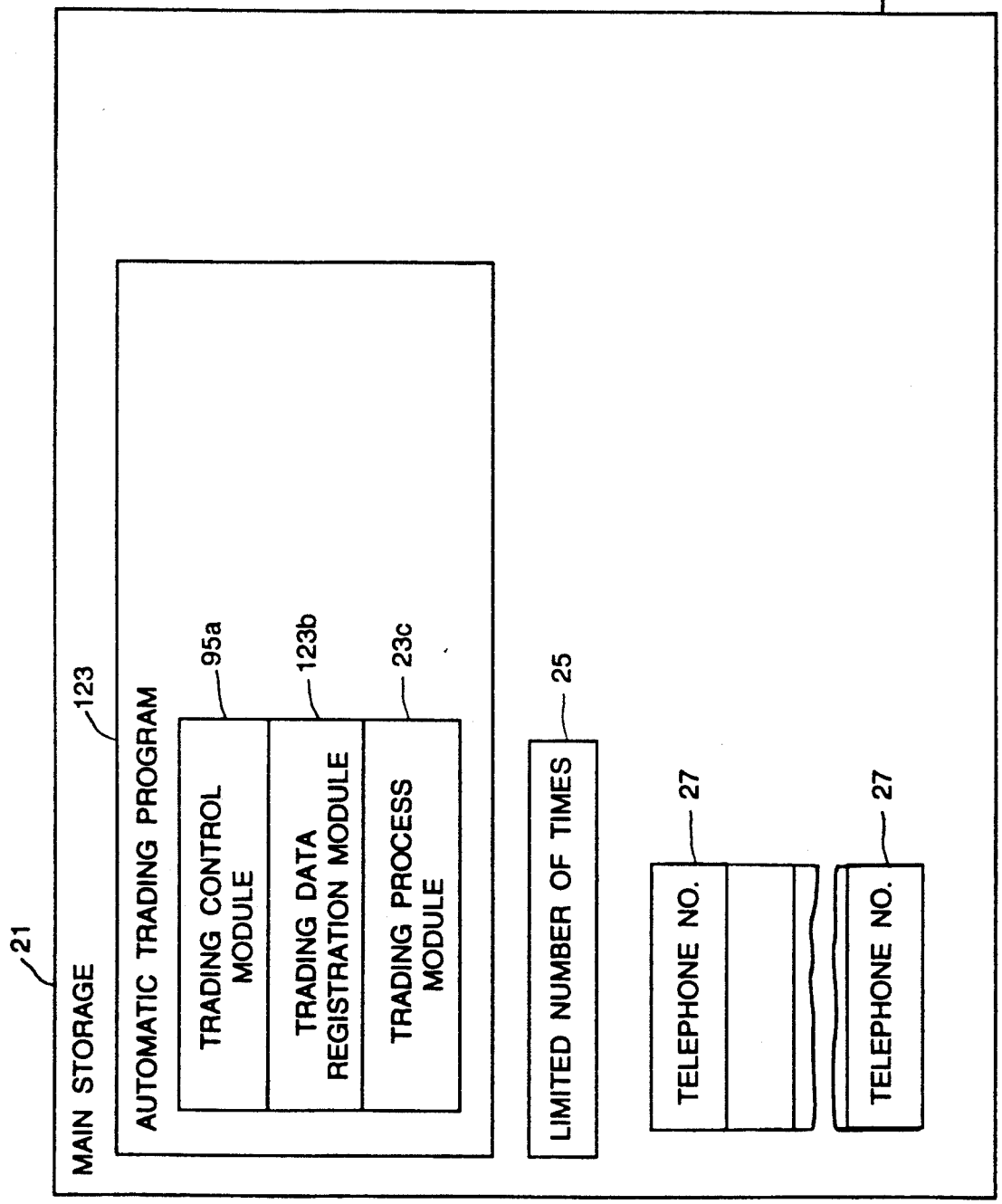
Figure 11C:
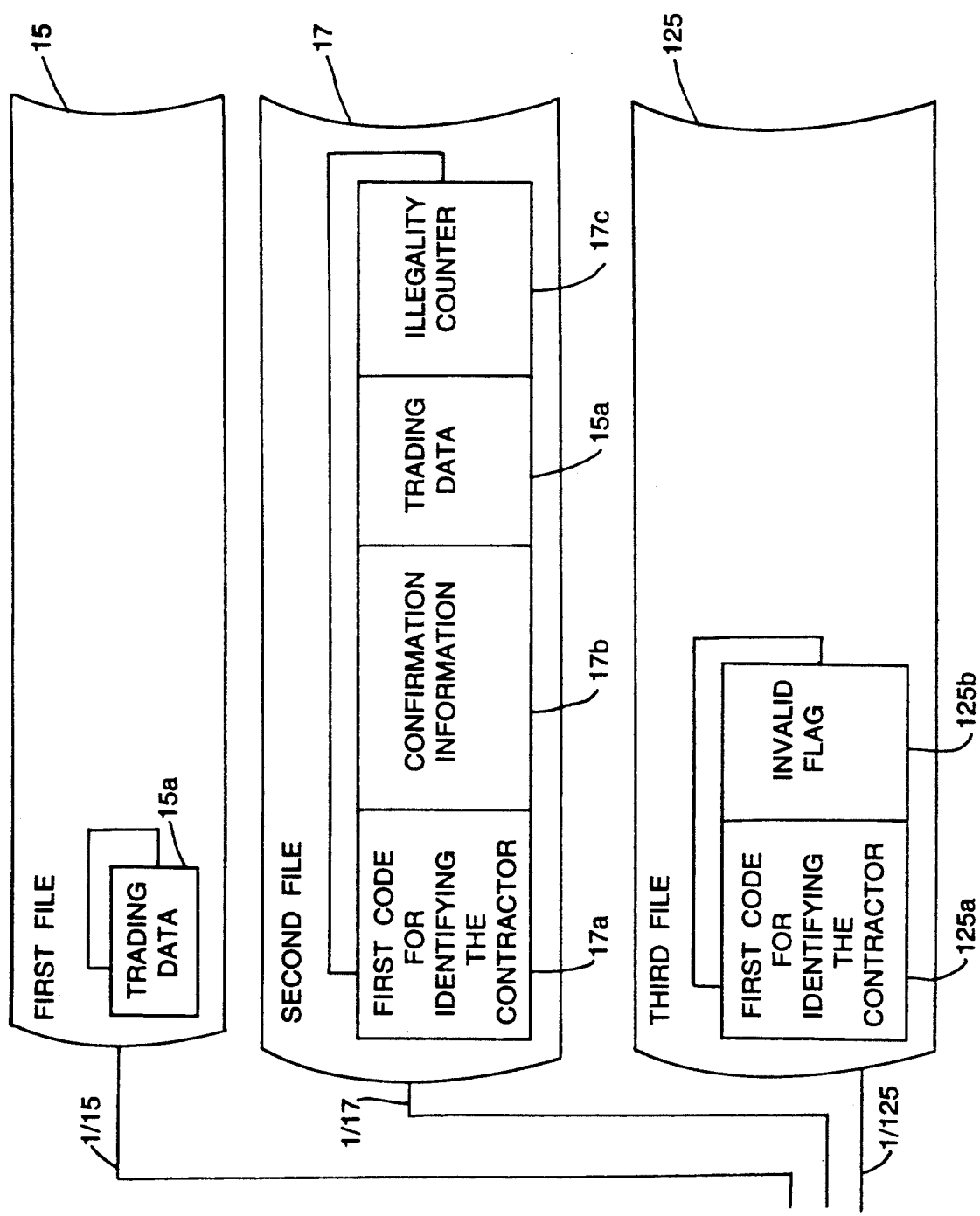

FIG. 11A-C is a whole constructional assembly figure of a fourth alternative embodiment.

The most important point of feature of this embodiment is in that the unique data for the contractor utilized for verification in the second contractor recognizing method is not collectively administrated, but is separately administrated in an electronic device, typically an IC card, of the contractor's own.

Item 121 (FIG. 11B) is an electronic device, typically an IC card, in which user information set to each contractor is stored. The content of user information is similar to the content of any one record in the third file of the first, second and third embodiments, except for the invalid flag.

Item 123 is an automatic trading program comprising an automatic trading control module 95a for overall program control, an automatic trading registering module 123b and a trading process module 23c by which the conventional automatic trading process is performed.

Item 125 (FIG. 11C) is a third file to store user information which is set to each contractor. In the case of this embodiment, the file includes a first contractor specified code 125a and an invalid flag 125b in addition to the combination of the conventional user code and password described as the contractor specified first code 17a.

Figure 12B:
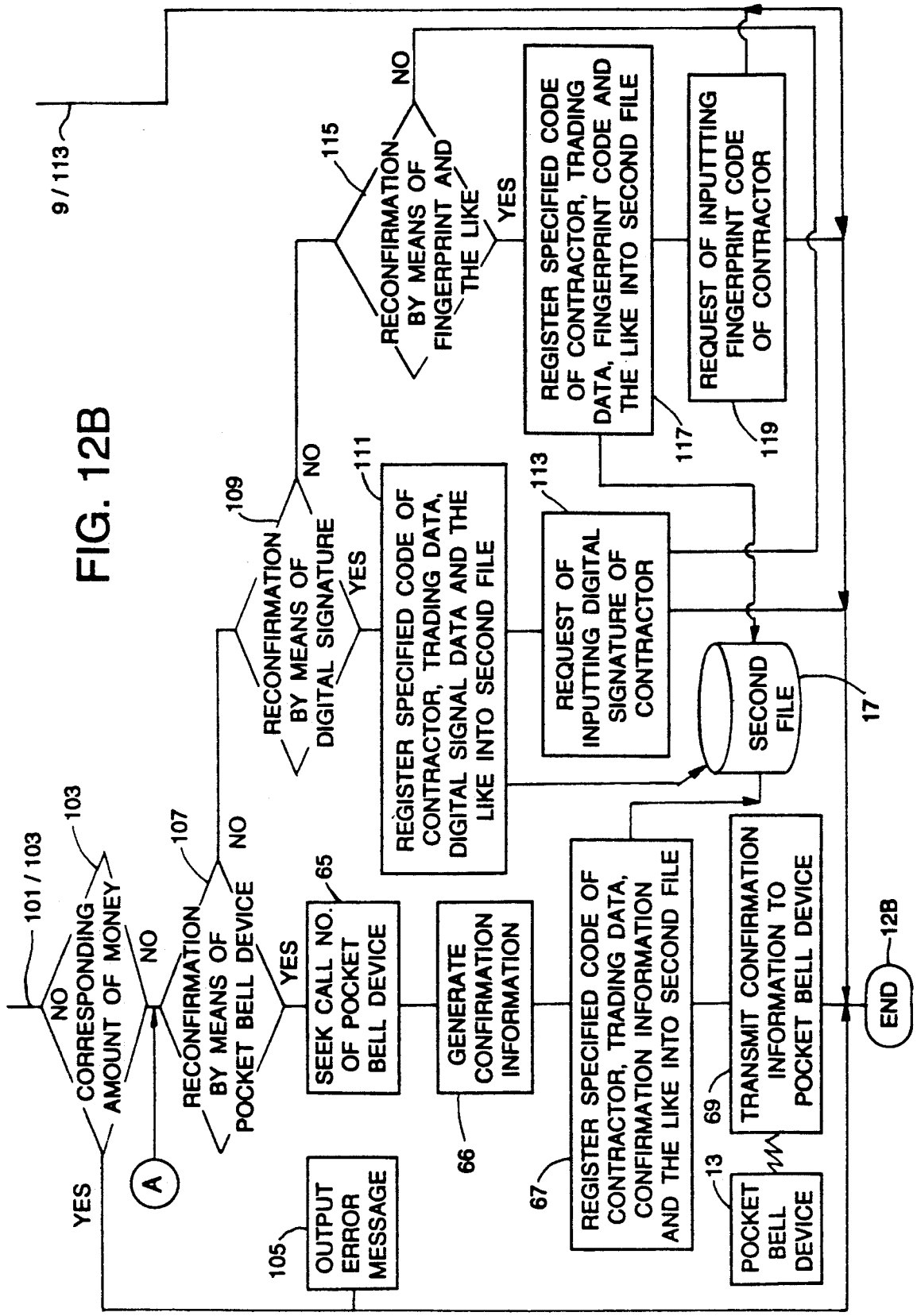

The processing by the automatic trading program 123 will be described on the basis of FIG. 12A-B.

The process of the automatic trading program 123 is controlled by the trading control module 95a. Since the contents of the process of the trading control module 95a and the trading process module 23c are the same as that of the third embodiment, the description thereof is omitted.

The content of the process of the trading data registering module 123b is that when the response is YES at the step 56, since the user information is read from the electronic device such as the IC card, the input request (step 127) and the input process (step 129) are added to process of the third embodiment, and the other matters are not changed.

The identifying information of the contractor for the second contractor recognizing method is stored in the electronic device such as the IC card to be used when read out at the time of the trading, and therefore, is not necessary for collective administration. The cost for the administration can be accordingly reduced.

Figure 13B:
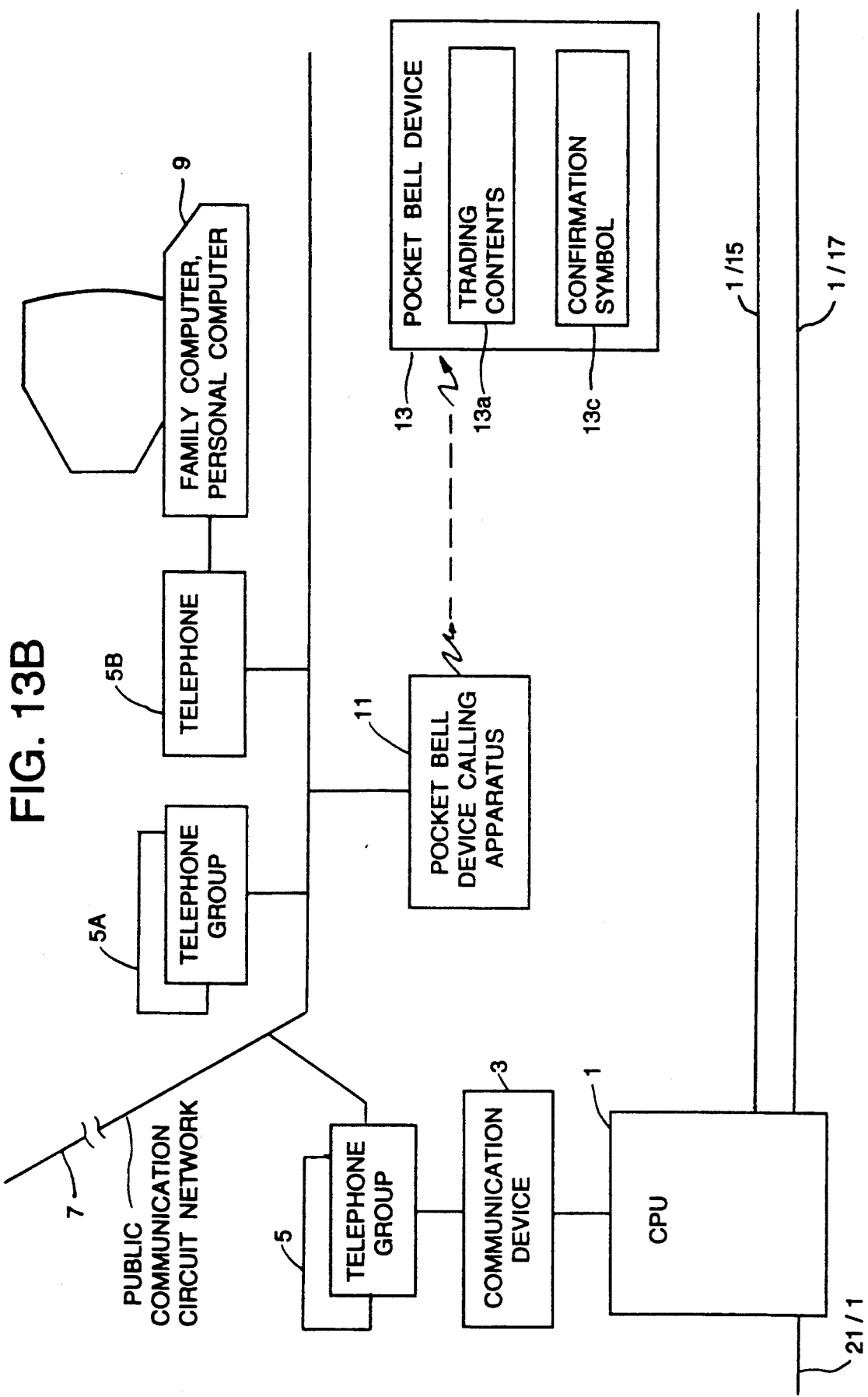
Figure 13C:
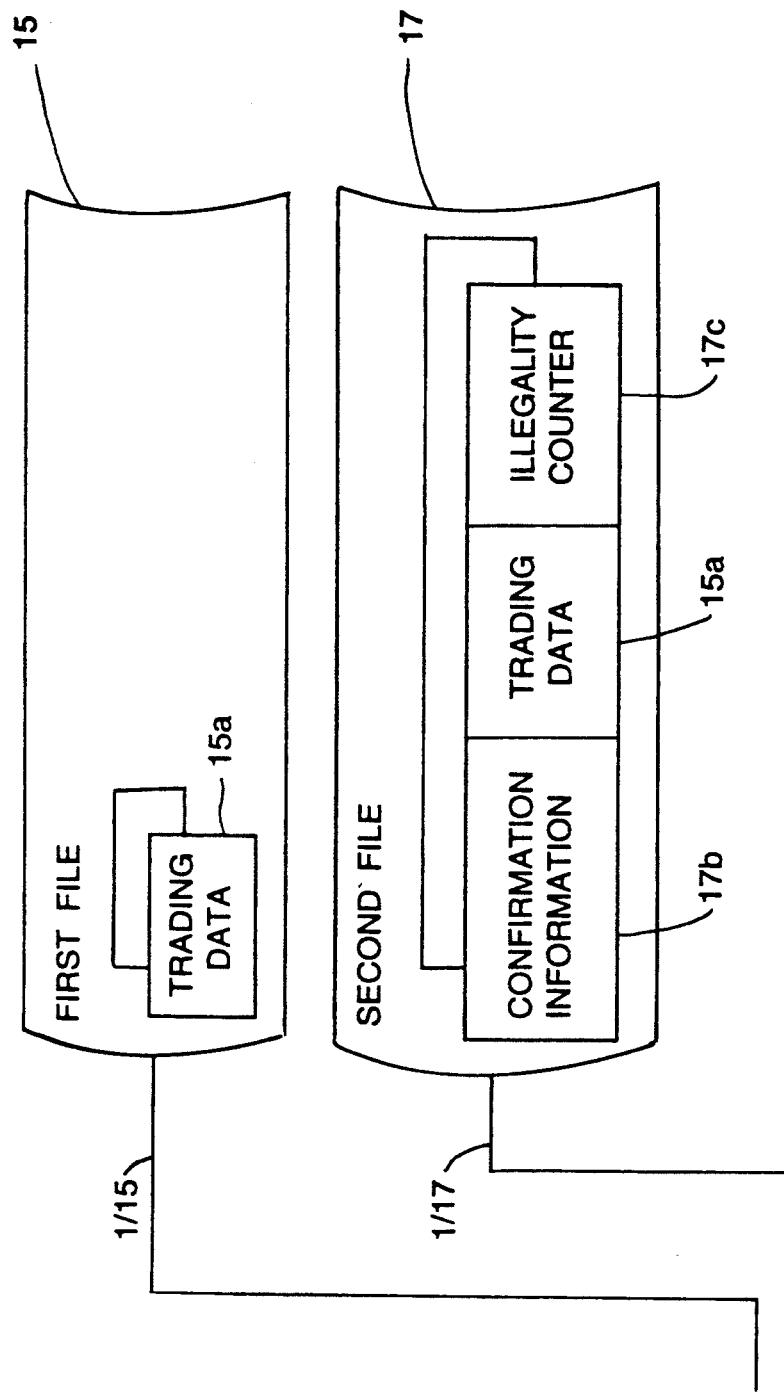

FIG. 13A-C is a whole constructional assembly figure of a fifth alternative embodiment.

The most important feature of this embodiment is that the person who has the pocket bell device, and who also knows the calling number of the pocket bell device, is recognized to be a correct user. In response to the request of automatic trading together with the calling number from the user, a message including the confirmation information relative to the pocket bell device is transmitted. And when the confirmation contact from the user based on the message is suitable, the request of automatic trading is recognized to be the correct trading.

In the case of this embodiment, the second file 17 includes a record group comprising the confirmation information 17b, the trading data 15a, the illegality counter 15a and the like.

Figure 14A:
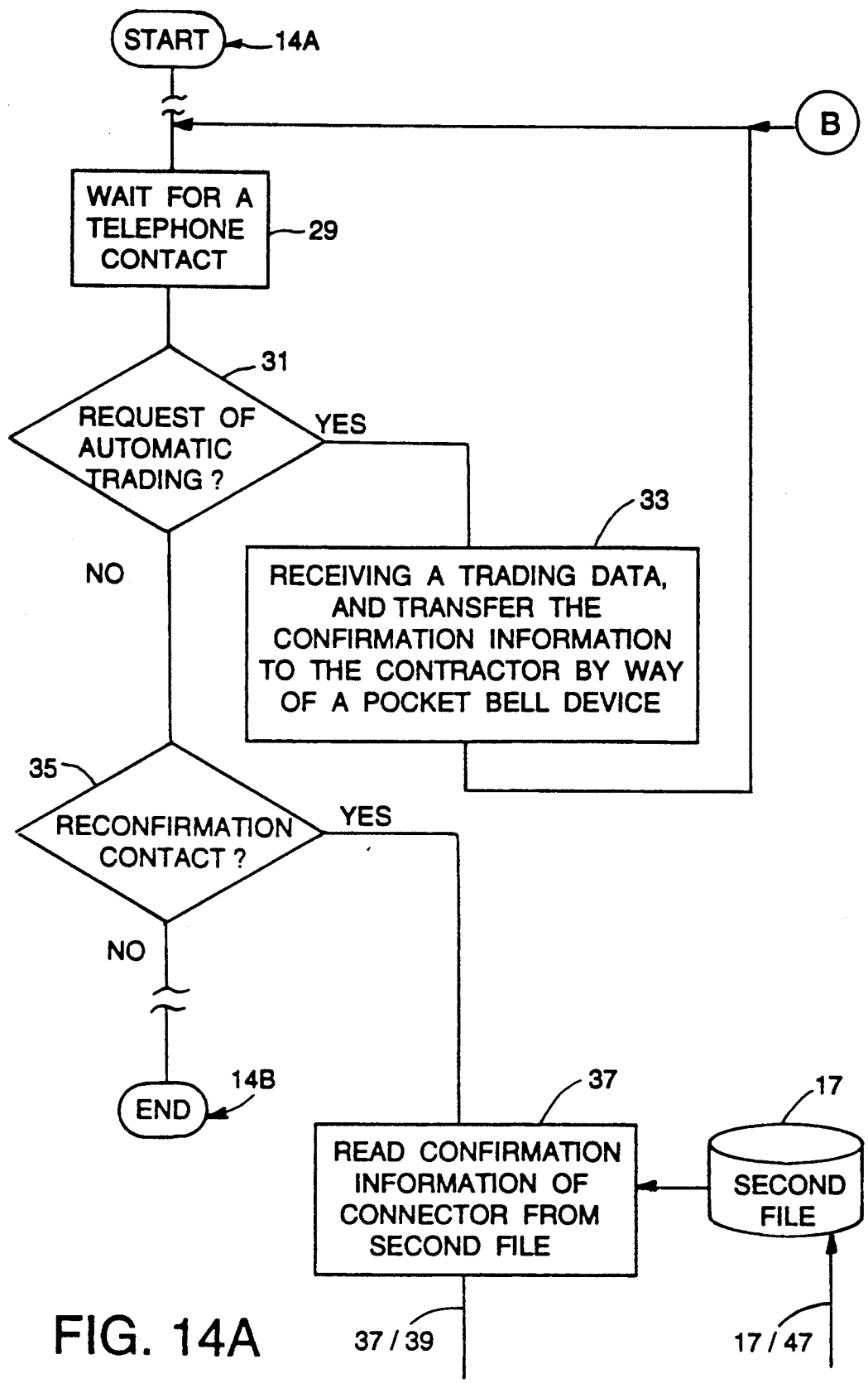
FIGS. 14A-B are a flowchart of process of the trading control module in the case of the fifth embodiment.
Figure 14B:
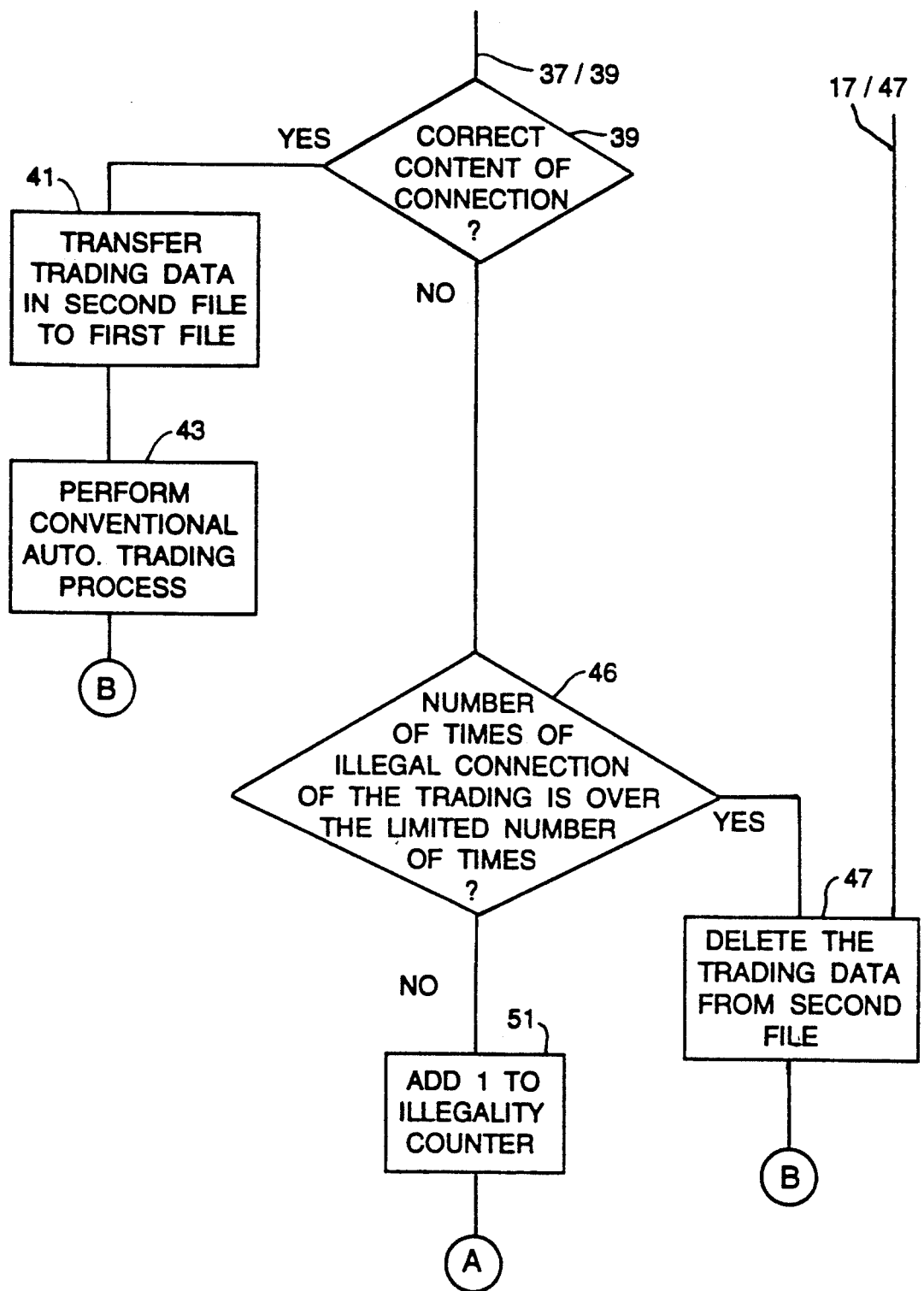
Figure 15:
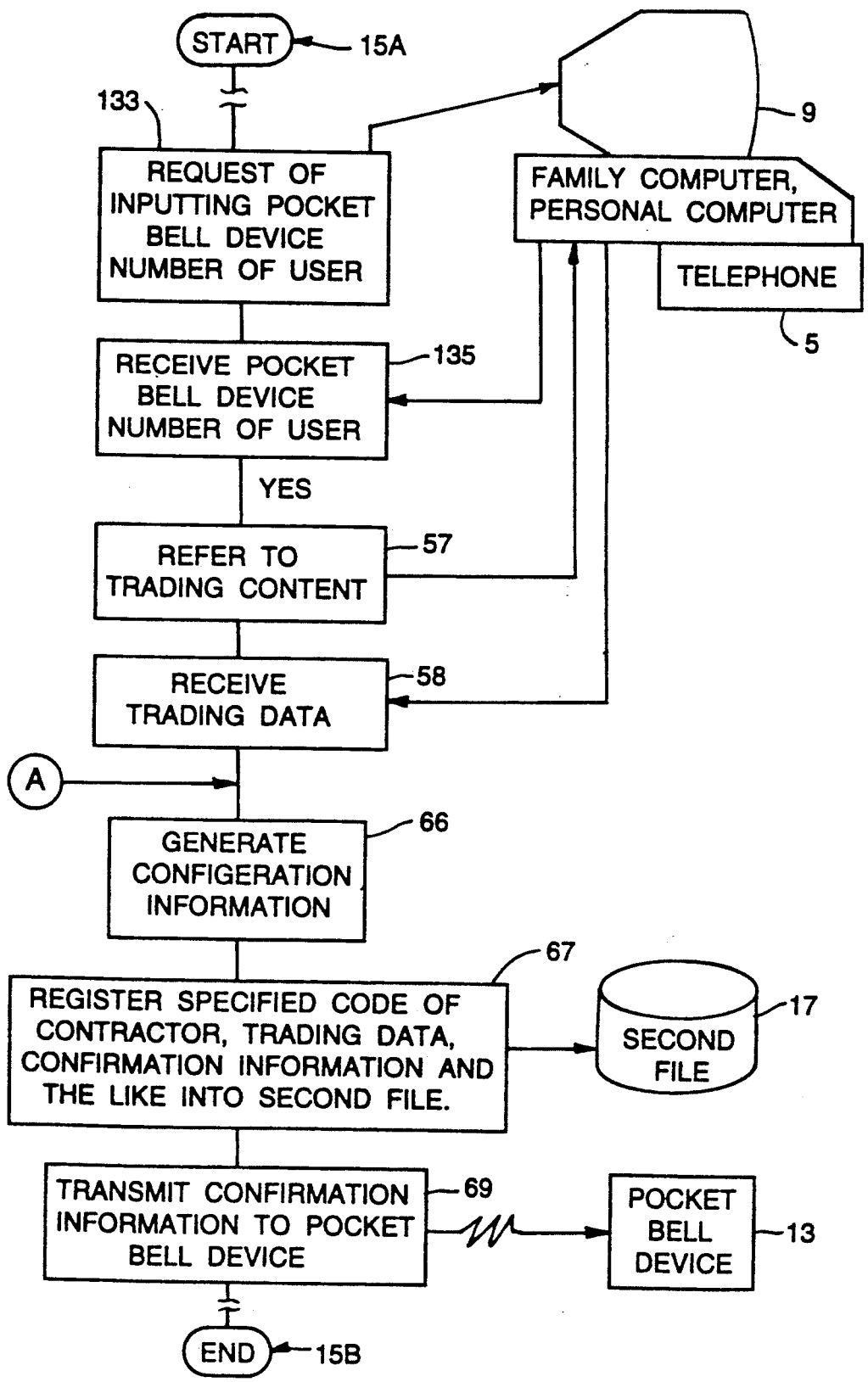
FIG. 15 is a flowchart of process of the trading data registering module in the case of the fifth embodiment.

The content of a process of the automatic trading program 131 (FIG. 13A) will be described with reference to FIG. 14A-B.

The process of the automatic trading program 131 is controlled by the trading control module 131a.

When the content of trading of the trading control module 131a is compared with that of the device of the first embodiment, the user information stored in the third file is not handled, so they are similar to each other except for removing the processes at the steps 44, 45, 49.

When the trading data registering module 131b is started, a request is made to input the calling number of the pocket bell device of the user (step 133), and the calling number of the pocket bell device is received (step 135). Further, an inquiry for the content of the request for automatic trading is made (step 57), and the content of the order is received (step 58). Either sequence of steps 133, 135 or steps 57, 58 may be set to the head position.

After that, similar to the case of the first embodiment, the confirmation information is generated (step 65), and the calling number of the pocket bell device, the automatic trading request data and the confirmation information comprising the confirmation symbol and the like are registered into the second file (step 67). Then the symbol and numerical value indicating the content of the automatic trading, the confirmation symbol and the like are transmitted to the pocket bell device (step 69), and thus the process of the module is terminated.

According to this embodiment, the verifiable identity for the user is not necessary to be previously stored and thus the automatic trading method can be available for many indefinite users.

Figure 16A:
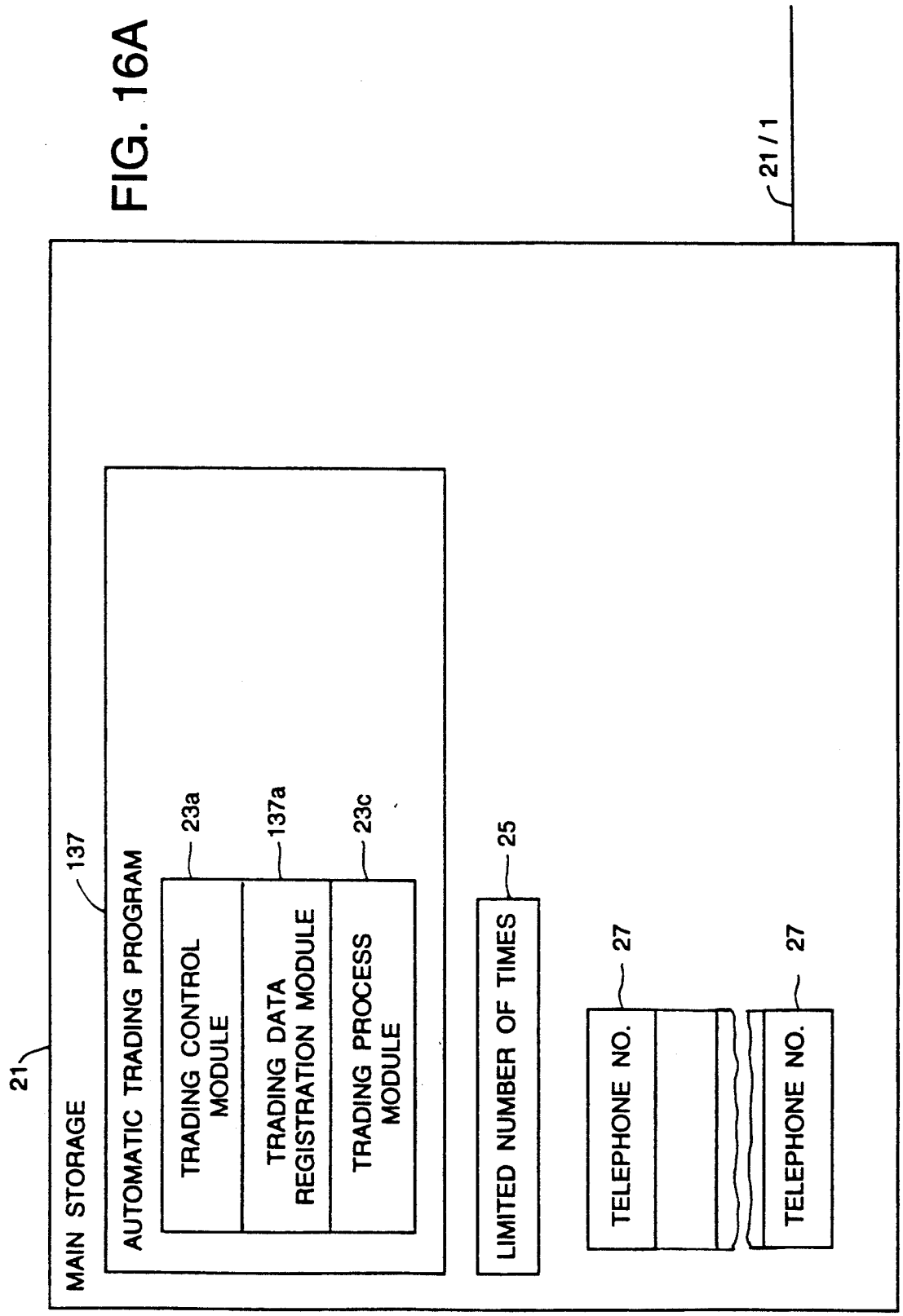
FIGS. 16A-C are a whole constructional figure of a sixth embodiment of this invention.
Figure 16B:
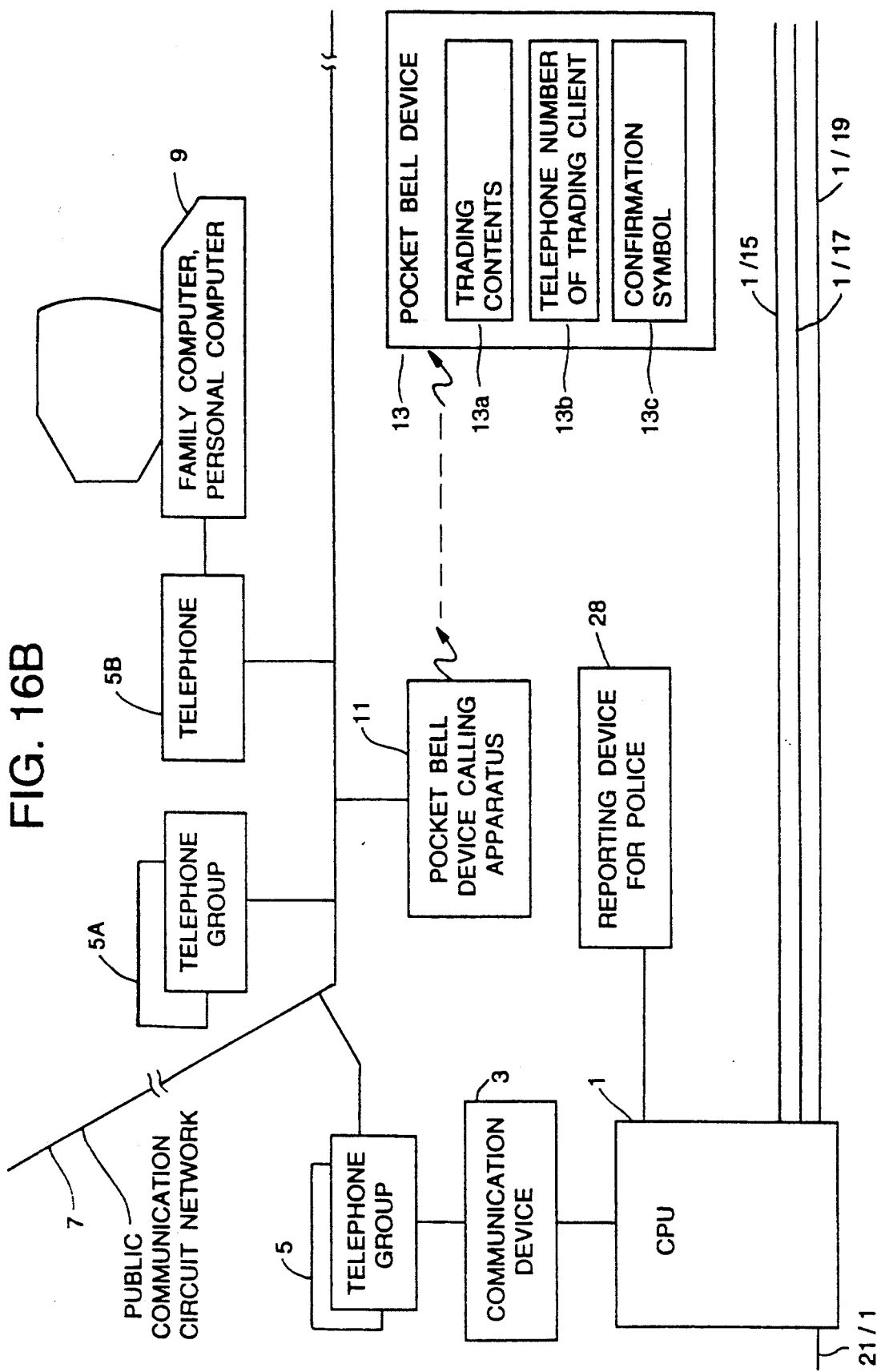
Figure 16C:
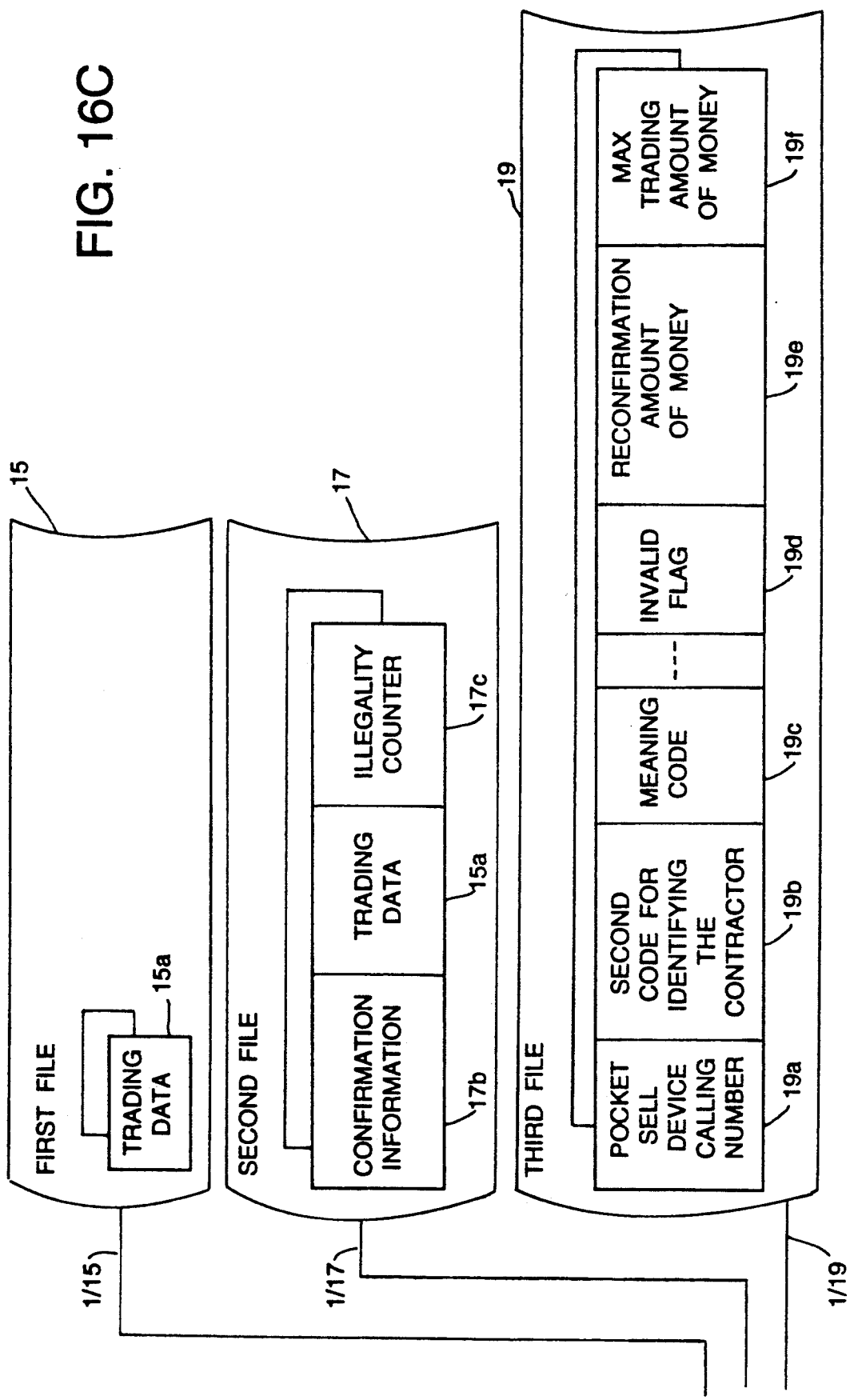

FIG. 16A-C is a whole constructional assembly figure of the sixth embodiment. The most important feature of this embodiment is that the person knowing the calling number of the pocket bell device, and also knowing the contractor specified second code previously set to that pocket bell device is recognized to be a correct user.

When the construction of the second file 17 and the third file is compared with that of the first embodiment, they are similar to each other except for not having the contractor specified first code. Further, the trading control module 23a of the automatic trading program 137 and the content of process of the trading process module 23c are similar to those of the first embodiment.

Figure 17A:
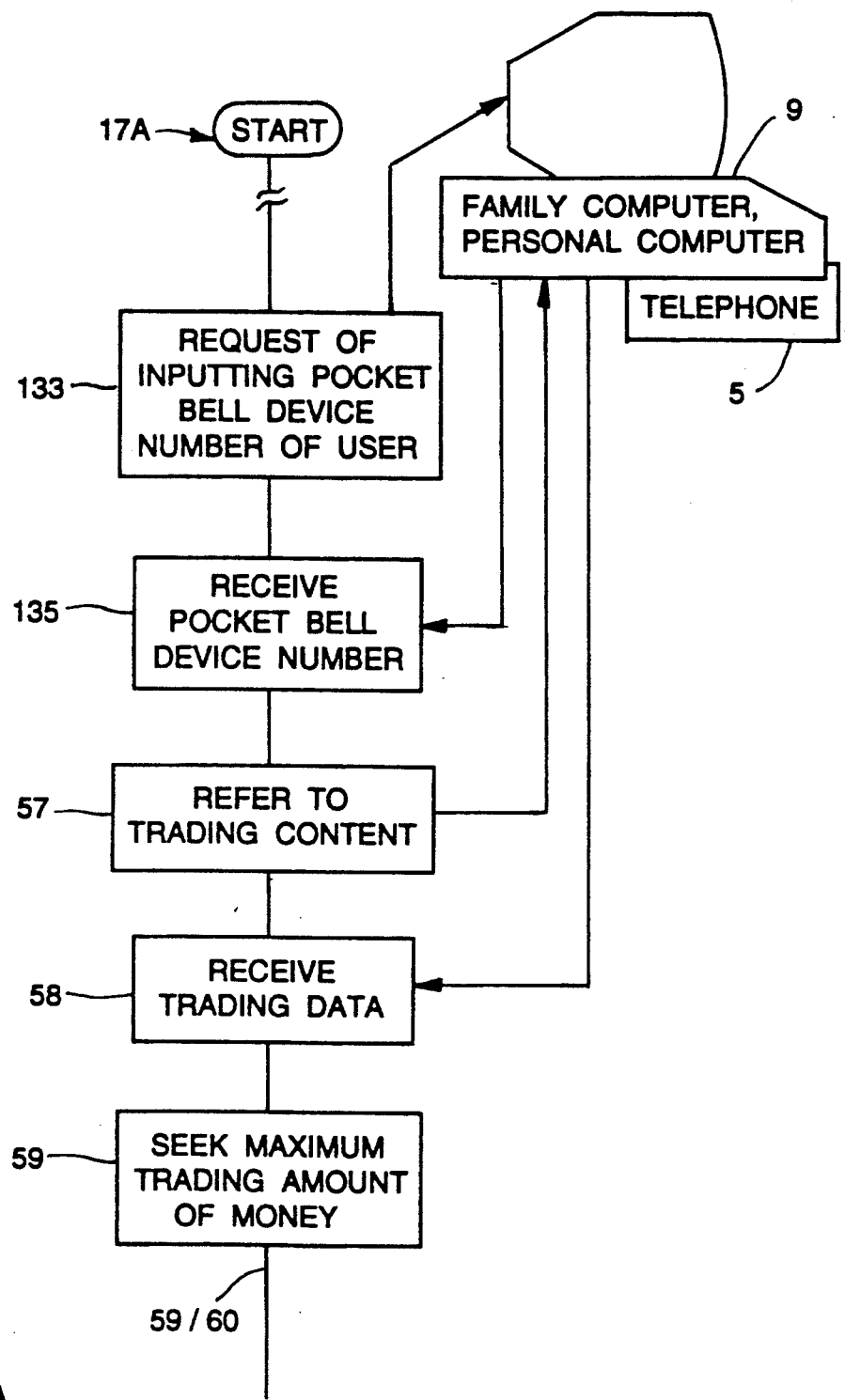
FIGS. 17A-B are a flowchart of the process of the trading data registering module in the case of the sixth embodiment.
Figure 17B:
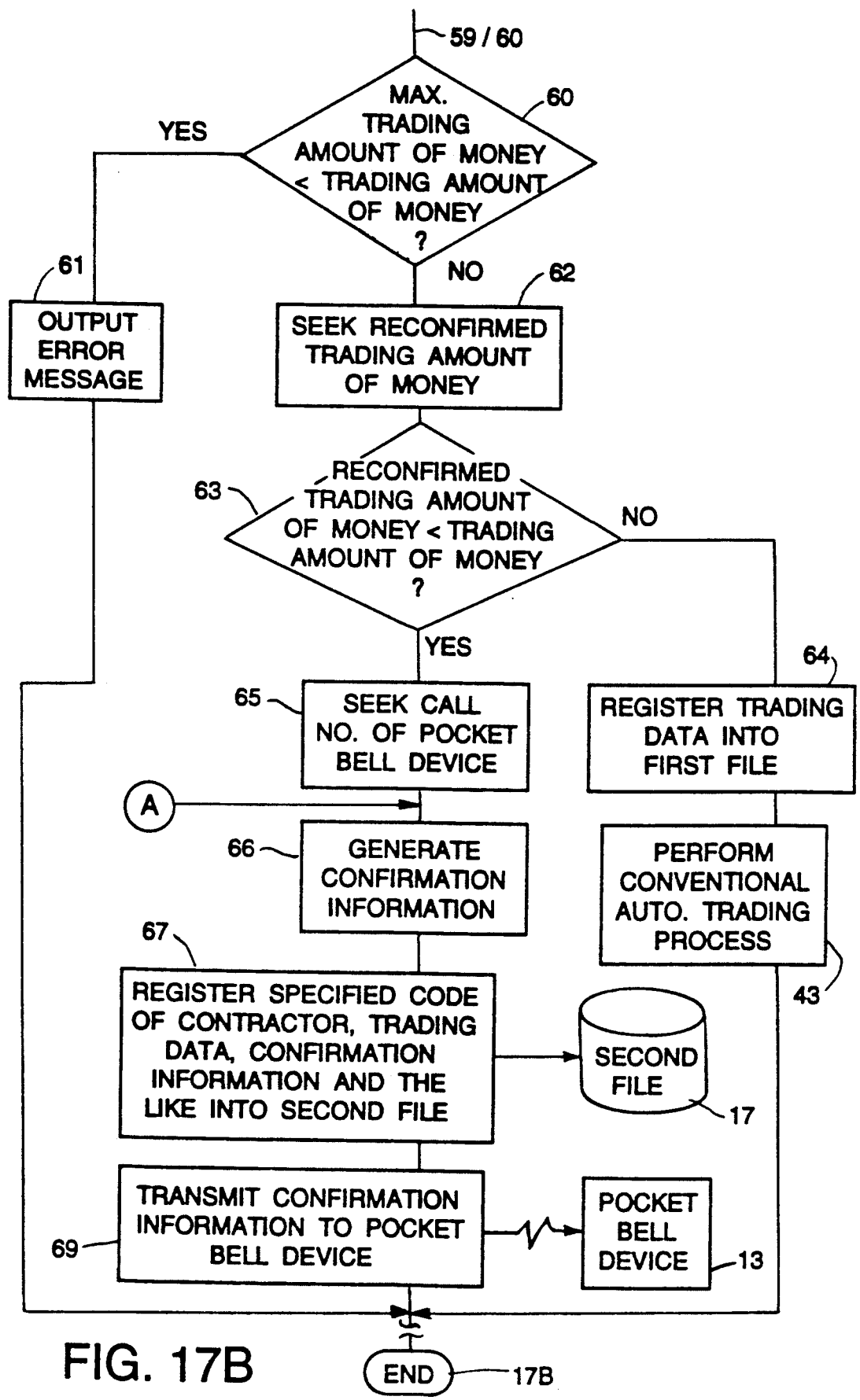

The process of the trading data registering module 137a will be described in detail on the basis of FIG. 17A-B. The content of the processes of the steps 133, 135, 57, 58 is similar to that of the fifth embodiment. Further, the process following the step 59 is the same as that of the first embodiment.

According to this embodiment, in the case that at least one other specified code is previously set for identifying the person in question, in addition to the calling number of the pocket bell device of the contractor, it is added to the calling number for use as the confirmation code of the person in question, and thus the automatic trading method for many indefinite users can be realized with high reliability, without requiring to set the code to identify the person in question to each trading object.

Figure 18A:
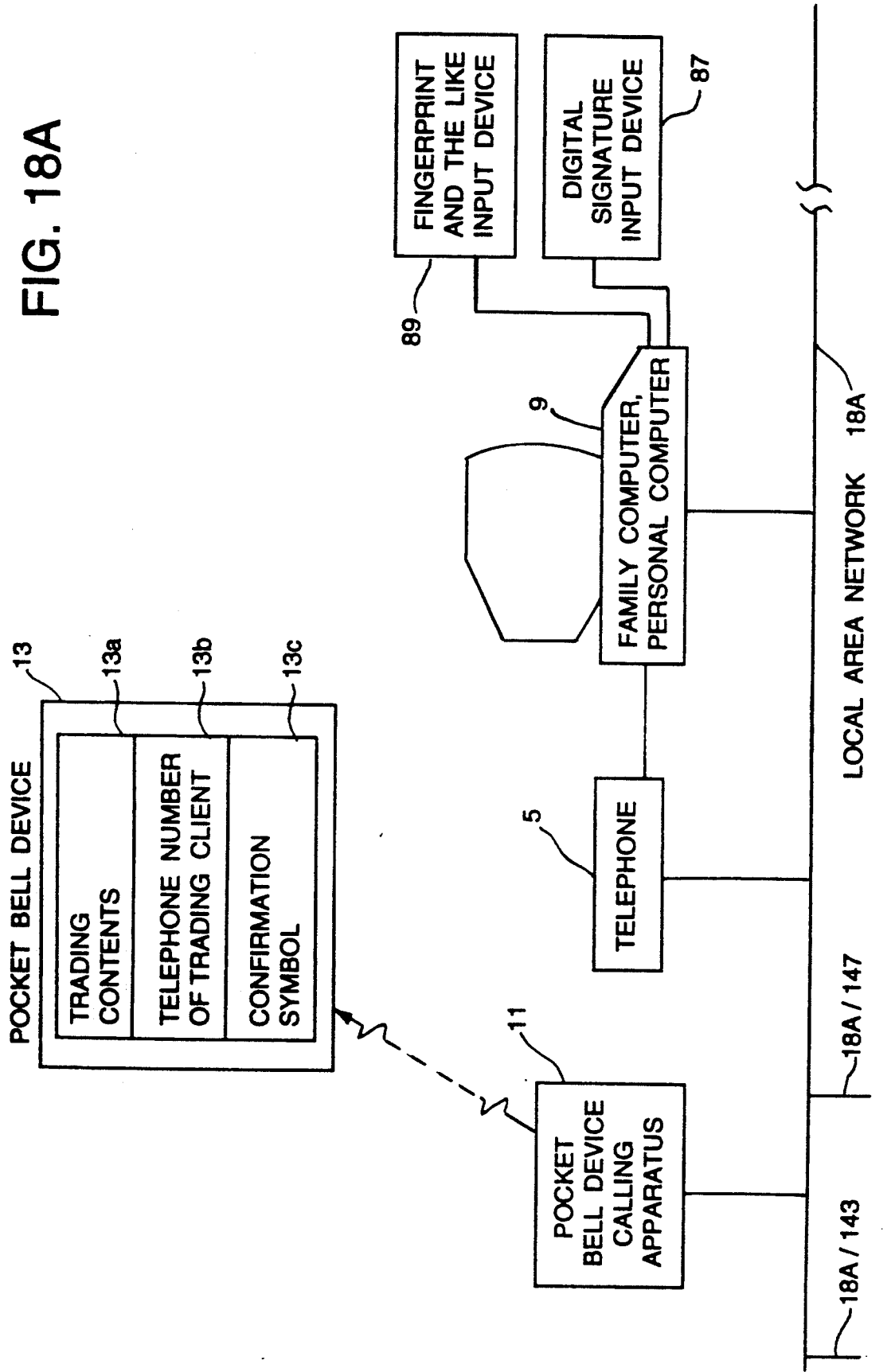

FIG. 18A-C is a whole constructional assembly figure of the sixth embodiment. The most important feature of this embodiment is that the processing device for recognizing the contractor is separated from the processing device for the automatic trading. When the contractor is correctly recognized, the automatic trading data is transferred to the processing device for the automatic trading process so as to distribute the load between the contractor recognizing process and the automatic trading process, and thus reduce the load to the automatic processing device in the case of the automatic trading with many contractors.

Item 137 (FIG. 18B) is the trading confirmation program which comprises the trading confirmation control module 137a for master control of the program, and the trading data registering module 95b. Item 139 (FIG. 18C) is the automatic trading program which comprises the automatic trading control module 139a for overall control, and the trading process module 23c by which the conventional automatic trading process is performed.

Item 141 is a circuit network which is limited to a relatively narrow range, typically the local area network LAN, and 143 is a communication network of wide range.

It is assumed that plural local area networks 141 are connected to the communication network 143. The central processing unit 145 is connected to the local area network via the communication device 147.

A computer connected to the communication network is described as the host computer for the purpose of distinction and a computer connected to the local area network is described as a department computer.

Further, it is of course able to connect a terminal device such as the family computer, personal computer and the like to the department computer via a specialized wire, and to connect the department computer to the host computer via a specialized wire. This embodiment is characterized in that the process of confirming the person in question for the automatic trading is performed by the department computer to which the family computer or the personal computer is connected, and the automatic trading process is performed by the host computer.

The construction of equipments other than those described above is similar to that in the case of the third embodiment.

Figure 19A:
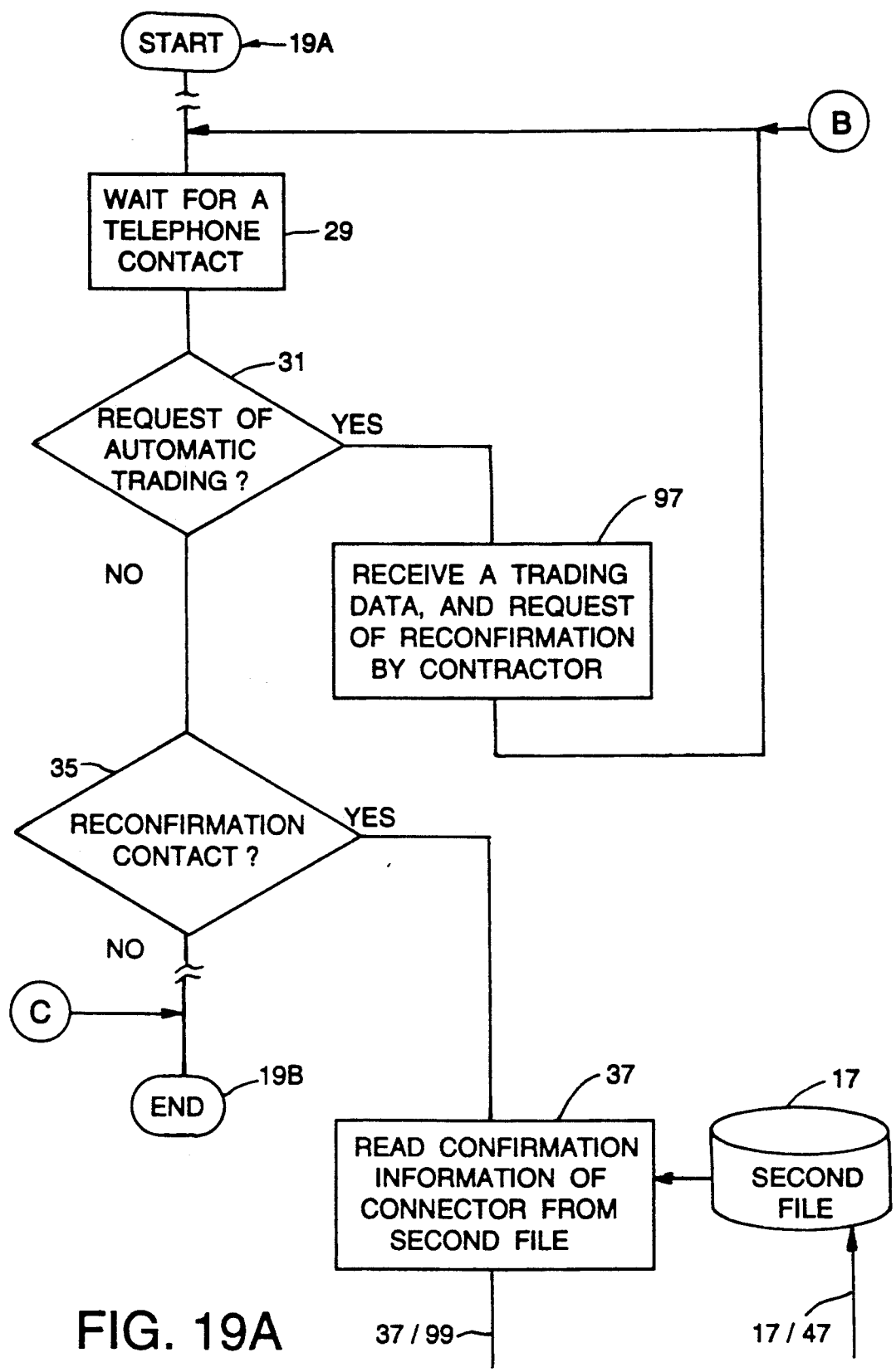
FIGS. 19A-B are a flowchart of the process of the trading confirmation control module in the case of the seventh embodiment; and, FIG. 20 is a flowchart of the process of the trading control module in the case of the seventh embodiment.
Figure 19B:
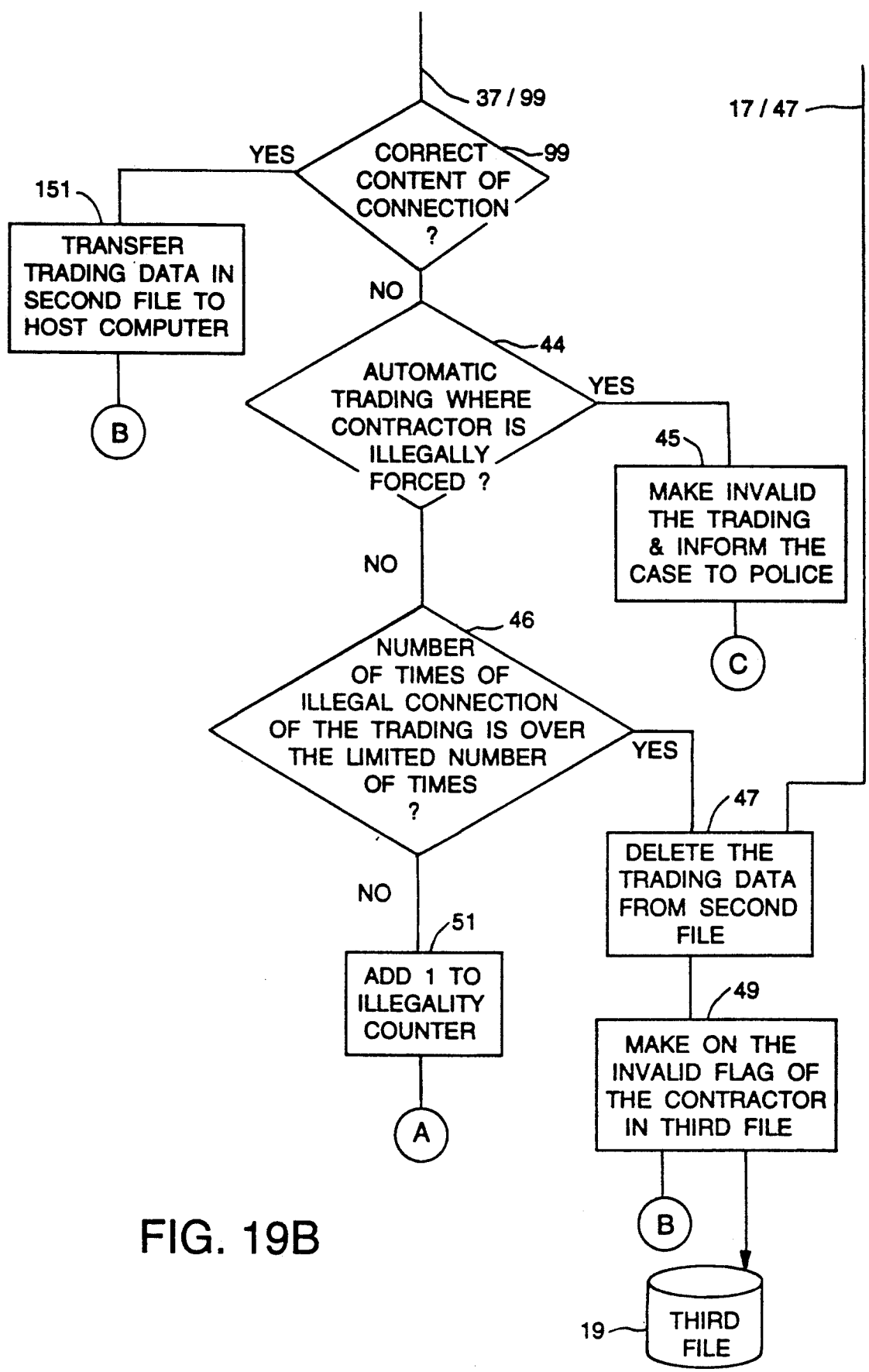

The content of the process of the trading confirmation program 137 in the case of the department computer will be described with reference to FIGS. 19A-B.

The process of the trading confirmation program 137 is controlled by the trading confirmation control module 137a. This embodiment is similar to the third embodiment except that the trading data is registered in the second file of the department computer (step 151) instead of the step 41, and that the step 43 is deleted since the automatic trading process is performed by the host computer.

Since the content of process of the trading data registering module 95b is similar to that of the third embodiment, the description thereof is omitted.

Figure 20:
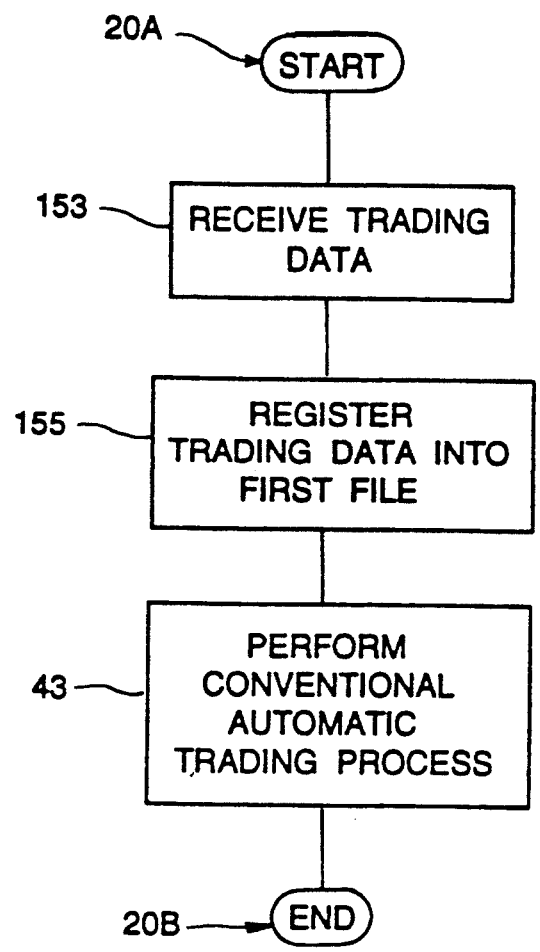

Next, the content of process of the automatic trading program 139 by the host computer will be described on the basis of FIG. 20.

The process of the automatic trading program 139 is controlled by the trading control module 139a.

The automatic trading data is received (step 153), and after being registered into the first file (step 155), the trading process module 23c is started to perform the conventional automatic trading process (step 43).

The content of process of the trading process module 23c is similar to that of one similar to the first embodiment, and therefore, description thereof is omitted.

Further, when the trading data is transferred from the second file to the first file, the trading data is transferred together with the data to confirm the person in question such as the pocket bell device calling number, the digital signature data, or the fingerprint data and the like. When the data is added, the trading is recognized to be the correct trading in the automatic trading program. Further, the data to confirm the person in question relative to the contractor of the automatic trading is previously stored, and when the data to confirm the person in question matches said previously stored data, the trading is recognized to be the correct one.

Furthermore, needless to say, similar to the third embodiment, it is able to require to the contractor to input the confirming code of the person in question such as the digital signature, fingerprint and the like via the pocket bell device. And also, it is able to assign some one of plural digital signatures previously determined via the pocket bell device.

And also, similar to the fourth embodiment, it is able to store the reconfirmation information into electronic storage, typically the IC card of the contractor, and to perform the confirmation process module 137b on the basis of that data. At this time, the third file 85 is not necessary.

Further, similar to the fifth and the sixth embodiments, instead of the recognizing of the contractor with the contractor specialized first code 17a, the recognizing method of employing the calling number of the pocket bell device is also available.

According to this embodiment, the process for confirming the person in question is performed in the processing device for confirming the person in question only, and the automatic trading process itself is collectively performed by the host computer to distribute the load, it has a relatively low cost compared to the higher processing of the host computer.

EFFECTS OF THE INVENTION

According to this invention, in the case of the automatic trading method, a first confirming method is proposed to verify the fairness of the automatic trading by the agreement of the specialized code and password of the contractor. And in addition to this, a second confirming method is proposed to verify the fairness of the automatic trading via the communication device having at least wireless signal receiving function of the contractor's own different from the connection route of the automatic trading request such as a pocket bell device, a handheld telephone or a movable telephone (hereinafter they are described a pocket bell device together). Accordingly, even if the first confirming method is known by the third party, the selling/buying order against the will of the contractor is not realized, and thus the normal automatic trading can be performed.

And therefore, the trading state of operable in front of the third party can be realized, by means of providing only the communication device for the second confirming method by the contractor privately, and by means of employing the communication device for indication of high function and of high cost so that the trading order operations are made easier which are shared with the third party.

Furthermore, according to this invention, any natural persons or legal persons proposing the automatic trading can not perform the operations such as selling/buying, cancellation of contract, change of deposit condition, and therefore, the automatic trading service of higher reliability can be proposed relative to the contractor's property.

Further, instead of the specified code of the contractor employed in the case of the automatic trading request in response to the confirmation notice to the pocket bell device, the contractor is made to connect the second specified code to identify the contractor which is decided between the contractor, and thus, even if the specified code and the password of the contractor are known, and also even if the pocket bell device is illegally employed, the illegal trading is not realized. And further, this is also applied to the criminal policy by means of deciding plural second specified codes, and giving the meaning of connection from each contractor, the effects of protecting the contractor from the criminal as follows; for examples, the following assignment is made, code AAA corresponds to the normal trading code BBB corresponds to the trading by forcing of the third party against the will of the contractor's own code CCC corresponds to the illegal trading not known by the contractor In the case of the code BBB and code CCC, the trading is made invalid, and also the matter is automatically reported to the police.

Furthermore, since plural calling numbers of the pocket bell device can be set, in the case that the transmitting range of the pocket bell device is limited, wide range of activity is made available by means of having the pocket bell device to each section by the user.

Still further, the complexity of operations can be reduced by means of deciding the application of the second confirming method via the pocket bell device depending on the amount money of the trading.

Further, the balance between the grade of reliability and the easiness of operations may be also taken by means of selectively employing the routing method by way of the pocket bell device, the method of using the digital signature, the verifying method of the voiceprint, the combined method of these methods as the second confirming method.

Furthermore, the information about the contractors for the second confirming method is stored in the electronic device such as the IC card of each contractor's own, and said information is read out to use at the time of the trading, and therefore, it is not necessary to collectively administrate the contractor information for the second confirming method, and thus the administration cost therefor may be reduced.

Further, the method for confirming the person is question may be realized without previously providing the stored information in the case of the automatic trading, and thus the automatic trading method can be realized in which many indefinite users are made to be customers.

Still further, the process for confirming the person in question is performed in the processing device for confirming the person in question only, and the automatic trading process itself is collectively performed by the host computer to distribute the load, and therefore, it is realized by relatively low cost compared to the host computer only the processing cost thereof being relatively high.

Having thus described the invention, we claim:

1. A method of controlling an automatic trading system having an automatic trading request receiving step in which trading data is transferred from a first communication device by a first communication route into a first file of the system by way of a network, a trading data storing step, and an executing step in which automatic trading processing is executed using said trading data, comprising steps of:
   storing a calling number of a second communication device in another file of the system;
   communicating with the second communication device by a second communication route by informing confidential confirmation information using the calling number;
   determining that the trading request is made by a fair contractor upon receipt of correct reconfirmation contact derived from the confidential confirmation information;
   storing the trading data into the first file when fairness of the trading data is reconfirmed;
   transferring the trading data to a first processor including the first file from a second processor associated with the second communication device when the fairness of the trading is reconfirmed; and,
   registering the transferred trading data into the first file.

2. A trading method for communicating a trade of selected items between a trader and a contractor and for verifying with the contractor that the trade is authorized, comprising the steps of:
   identifying a first specified code representative of the contractor after a request for trading to the trader from a user through a first communication device by a first communication route;
   selecting a second communication device indicated by the first specified code for contacting the contractor comprising determining a preselected calling number of a one of a pocket bell device and a handheld telephone;
   communicating to the contractor confidential reconfirmation information through the second communication device by a second communication route different from the first communication route;
   verifying that the user is the contractor by the trader receiving back from the contractor the reconfirmation information; and,
   executing the request for trading.

3. The trading method as claimed in claim 2 wherein the communicating to the contractor comprises wireless transmitting to the second communication device of the contractor.

4. The trading method as claimed in claim 2 wherein the reconfirmation information includes a calling number of the trader and wherein the verifying includes the contractor calling the trader at the calling number.

5. The method of communicating the trade according to claim 2, further comprising:
   storing said first specified code of the contractor, said confirmation to be informed to the second communication device and the trading data into a second file, prior to the step of verifying, which verifying further includes retrieving the confirmation information from the second file in order to evaluate the content of the reconfirmation contact, and transferring the trading data from the second file to the first file when trading is reconfirmed to be fair.

6. The method according to claim 2 wherein a telephone number of a telephone receiver for the reconfirmation contact from the contractor is predetermined for each contractor.

7. The method according to claim 2 wherein the confirmation information includes the first specified code and the verifying further includes comparing the code responded by the contractor with the confidential confirmation information informed to the contractor to confirm a fairness of the trading request.

8. The method according to claim 2 wherein the confirmation information includes a telephone number of the telephone receiver for reconfirmation contact from the contractor and a randomly generated confirmation code,
   and the verifying further includes comparing the telephone number and the code which is called and responding by the contractor with the confirmation informed to the contractor to reconfirm a fairness of the trading request.

9. The method as claimed in claim 8 wherein the informing further includes selecting a telephone number to be informed to the contractor as the confirmation information randomly among a plurality of telephone receivers for the reconfirmation contact from the contractor.

10. The method according to claim 9 wherein the selecting comprises selecting a non busy telephone number.

11. The method as claimed in claim 2 further including:
    registering as the confirmation information a second specified code which has been previously given by the contractor and which is different from the first specified code, and
    wherein the verifying includes comparing the first and second specified code responded by the contractor with the first and second specified codes of the confirmation information to reconfirm a fairness of the trading request.

12. The method of claim 11 wherein the registering includes registering a plurality of second specified codes.

13. The method as claimed in claim 11 further including storing the first specified code of the contractor, the confirmation information to be informed to the contractor through the second communication device, the second specified code and the trading data into a second file prior to the verifying, the verifying further including retrieving the confirmation information including the second specified code from the second file and, comparing the confirmation information with the second specified code informed to the contractor, and wherein the storing further includes transferring the trading data stored in the second file to the first file when the fairness of the trading is reconfirmed.

14. The method according to claim 13 wherein the inputting includes registering meaning codes, in which at least one represents a fair trading, in relation to the second specified code, and the storing further includes transferring the trading data from the second file to the first file when the confirmation information responded by the contractor coincides with the confirmation information informed to the contractor, and the second specified code responded by the contractor coincides with the second specified code which represents fair trading.

15. The method according to claim 13 wherein the verifying includes registering meaning codes wherein at least one represents an abnormal state, relative to the second specified code, and further including helping the contractor who responds with an abnormal state meaning code.

16. The method as claimed in claim 15 wherein the helping comprises reporting to the police.

17. The method of claim 15 wherein the helping comprises invalidating the trading.

18. The method of claim 15 wherein the confirmation information to be informed to the contractor includes information identifying a content of the trading.

19. The method of claim 18 wherein the content identifying information includes the first specified code.

20. The method of claim 18 wherein the content identifying information includes a predetermined character code corresponding to the content.

21. The method of claim 20 wherein the content identifying information includes a value of the amount of the trading.

22. A trading method for communicating a trade of selected items between a trader and a contractor and for verifying with the contractor that the trade is authorized in a system comprising a processor, a first file and first and a second communication devices, comprising the steps of:

inputting by a first communication route to said processor from said first communication device trading data and a first specified code to identify the contractor;

selecting a previously stored calling number according to the first specified code;

informing a confidential confirmation containing a randomly generated confirmation code information through said second communication device by a second communication route to the contractor using said calling number;

verifying with the contractor that the trade is authorized in response to a reconfirmation contact from the contractor on the basis of said confirmation information by comparing said code responded from the contractor with said confirmation information informed to said contractor to confirm the fairness of the trading request; and, storing the trading data into said first file when the trade is authorized.

23. The method according to claim 22 wherein the confirmation code corresponds to a telephone number included in a plurality of telephone numbers of telephone receivers for the reconfirmation contact from the contractor.

24. The method of claim 22 wherein the inputting comprises registering a plurality of calling numbers of the second communication device in association with the first specified code, and the informing comprises informing the confirmation information to a plurality of second communication devices simultaneously.

25. The method of claim 22 wherein the selecting includes deciding if reconfirmation is necessary based on a value of the trading.

26. The method according to claim 22 wherein the informing includes informing the confirmation information again when the content of the reconfirmation contact does not coincide with the confirmation information, and the verifying includes invalidating the trading when a number of times of no coincidence exceeds a predetermined number.

27. The method of claim 26 wherein the verifying includes deleting the trading data from the second file.

28. The method of claim 26 wherein the verifying includes registering an added meaning code representing an unfair contractor for the first specified code for the number of times of no coincidence, and the selecting includes not accepting a trading request from a contractor having a first specified code including the added meaning code.

29. The method of claim 26 wherein the verifying further includes erasing the first specified code registered in the inputting when the number of times of no coincidence exceeds the predetermined number.

30. The method of claim 22 wherein the inputting includes registering a first class code representing a class of the automatic trading and a second class code representing a class of the reconfirming in association with the first specified code, and the informing includes selecting the first class code based on the content of the trading data and executing reconfirmation processing in correspondence with the second code.

31. The method of claim 30 wherein the informing includes informing a message to the second communication device urging the contractor to respond with reconfirmation contact.

32. The method of claim 30 further including storing data comprising contractor identifying information in an electronic memory device of the contractor, prior to the request for automatic trading, wherein the inputting includes registering the data in association with the first specified code, the informing includes informing a message to the second communication device urging the contractor to respond with the data for reconfirmation contact, and the verifying includes comparing responded data with registered data.

33. An apparatus for controlling an automatic trading system having
- a first contractor recognizing means based on a first specified code identifying the contractor and trading data, communicated from a first communication device;
- means for registering the trading data into a first file; and,
- automatic trading means for trading on the basis of the trading data registered in the first file, said automatic trading means comprising:
- means for storing the first specified code and an associated calling number of a second communication device as one set;
- means for identifying the calling number in response to a request for automatic trading including the first specified code;
- means for storing in a second file the first specified code and associated confirmation information for transfer to the second communication device and the trading data;
- a second contractor recognizing means for recognizing the request for automatic trading from a correct contractor when the content of a reconfirmation contact matches the confirmation information stored in the second file in response to a reconfirmation contact from the second communication device; and,
- means for transferring the trading data stored in the second file to the first file when a fairness of the trading data is reconfirmed.

34. The apparatus of claim 33 wherein the second communication device has a portable wireless receiving function.

35. The apparatus of claim 33 wherein the second communication device comprises a pocket bell device.

36. The apparatus of claim 33 wherein the second communication device comprises a handheld telephone.

37. The apparatus of claim 33 further including an electronic memory device including reconfirmation contact information, and means for inputting the information to the automatic trading means for automatic trading.

38. The apparatus of claim 33 further including a first processor for performing the contractor recognition, a second processor for performing trading processes and means for transferring the trading data from the first processor to the second processor.

39. The system as defined in claim 38 wherein the second communication means includes a pocket bell device for personally verifying with the contractor that the trade is authorized.

40. The system as defined in claim 38 wherein the second communication device includes a portable telephone for personally verifying with the contractor that the trade is authorized.

41. The system as defined in claim 38 wherein the trader processing means includes register means for temporarily holding trading data defining the trade pending a verification with the contractor that the trade is authorized.

* * * * *

UNITED STATES PATENT AND TRADEMARK OFFICE
CERTIFICATE OF CORRECTION

PATENT NO. : 5,315,634
DATED : May 24, 1994
INVENTOR(S) : Kazuaki Tanaka, et al.

It is certified that error appears in the above-indentified patent and that said Letters Patent is hereby corrected as shown below:

Claim 22, column 19, line 54, before "first" insert --a--.

Signed and Sealed this

Sixteenth Day of August, 1994

*Attest:*

BRUCE LEHMAN

*Attesting Officer*     *Commissioner of Patents and Trademarks*